(12) United States Patent
Fujii et al.

(10) Patent No.: US 9,011,588 B2
(45) Date of Patent: *Apr. 21, 2015

(54) INKJET TREATMENT LIQUID AND IMAGE FORMING METHOD USING TREATMENT LIQUID

(75) Inventors: Hidetoshi Fujii, Kanagawa (JP); Hiroshi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/000,281

(22) PCT Filed: Feb. 17, 2012

(86) PCT No.: PCT/JP2012/054486
§ 371 (c)(1),
(2), (4) Date: Aug. 19, 2013

(87) PCT Pub. No.: WO2012/111855
PCT Pub. Date: Aug. 23, 2012

(65) Prior Publication Data
US 2013/0321525 A1   Dec. 5, 2013

(30) Foreign Application Priority Data
Feb. 18, 2011   (JP) ................... 2011-033832

(51) Int. Cl.
*C09D 11/54* (2014.01)
*C09D 11/38* (2014.01)
(Continued)

(52) U.S. Cl.
CPC ........... *C09D 11/005* (2013.01); *B41M 5/0011* (2013.01); *C09D 11/322* (2013.01); *C09D 11/40* (2013.01); *C09D 11/54* (2013.01); *B41M 5/0017* (2013.01); *B41M 7/0018* (2013.01)

(58) Field of Classification Search
CPC .... C09D 11/0005; C09D 11/38; C09D 11/54; B41M 5/0017
USPC ................................ 106/31.43, 31.75; 347/21
See application file for complete search history.

(56) References Cited

U.S. PATENT DOCUMENTS 6,439,708 B1   8/2002   Kato et al.
6,517,199 B1 *   2/2003   Tomioka et al. ............... 347/101
(Continued)

FOREIGN PATENT DOCUMENTS

CN   101132930 A   2/2008
CN   101909898 A   12/2010
(Continued)

OTHER PUBLICATIONS

English translation of JP 2010/168433; Aug. 2010.*
(Continued)

*Primary Examiner* — Helene Klemanski
(74) *Attorney, Agent, or Firm* — Oblon, McClelland, Maier & Neustadt, L.L.P.

(57) ABSTRACT

To provide an inkjet treatment liquid, containing: a water-soluble coagulant; a water-soluble organic solvent; water; and an amide compound represented by the following general formula: where R is a C1-C6 alkyl group.

$$R-O-CH_2-CH_2-\overset{O}{\underset{\|}{C}}-N\overset{CH_3}{\underset{CH_3}{\diagdown}}$$

8 Claims, 1 Drawing Sheet

(51) Int. Cl.
*C09D 11/00* (2014.01)
*B41M 5/00* (2006.01)
*C09D 11/322* (2014.01)
*C09D 11/40* (2014.01)
*B41M 7/00* (2006.01)

(56) References Cited

U.S. PATENT DOCUMENTS

| | | | |
|---|---|---|---|
| 7,919,544 B2 | 4/2011 | Matsuyama et al. | |
| 8,109,622 B2 | 2/2012 | Goto et al. | |
| 8,242,201 B2 | 8/2012 | Goto et al. | |
| 8,382,271 B2 | 2/2013 | Goto et al. | |
| 8,722,175 B2* | 5/2014 | Goto | 428/195.1 |
| 8,820,875 B2* | 9/2014 | Fujii et al. | 347/16 |
| 2003/0079652 A1 | 5/2003 | Choy | |
| 2005/0179760 A1 | 8/2005 | Nakagawa et al. | |
| 2006/0007289 A1 | 1/2006 | Nito et al. | |
| 2007/0197685 A1 | 8/2007 | Aruga et al. | |
| 2008/0152825 A1* | 6/2008 | Mukai et al. | 427/466 |
| 2008/0233363 A1 | 9/2008 | Goto | |
| 2009/0098312 A1 | 4/2009 | Goto et al. | |
| 2009/0176070 A1 | 7/2009 | Goto et al. | |
| 2010/0196601 A1 | 8/2010 | Goto et al. | |
| 2010/0196602 A1 | 8/2010 | Koyano et al. | |
| 2010/0295891 A1 | 11/2010 | Goto et al. | |
| 2011/0057981 A1 | 3/2011 | Aruga et al. | |
| 2011/0164086 A1 | 7/2011 | Goto et al. | |
| 2011/0251430 A1 | 10/2011 | Shiraki et al. | |
| 2011/0310166 A1 | 12/2011 | Namba et al. | |
| 2012/0098883 A1* | 4/2012 | Matsuyama et al. | 347/21 |
| 2012/0128949 A1* | 5/2012 | Goto | 347/21 |
| 2012/0320137 A1 | 12/2012 | Fujii et al. | |
| 2013/0070017 A1* | 3/2013 | Fujii et al. | 347/20 |
| 2013/0101814 A1* | 4/2013 | Gotou et al. | 428/207 |
| 2013/0113860 A1 | 5/2013 | Gotou et al. | |
| 2013/0143008 A1* | 6/2013 | Gotou et al. | 347/20 |
| 2013/0155145 A1* | 6/2013 | Gotou et al. | 347/21 |
| 2013/0169724 A1* | 7/2013 | Gotou | 347/100 |
| 2013/0176369 A1* | 7/2013 | Gotou et al. | 347/100 |
| 2013/0194343 A1 | 8/2013 | Yokohama et al. | |
| 2013/0194344 A1 | 8/2013 | Yokohama et al. | |

FOREIGN PATENT DOCUMENTS

| | | |
|---|---|---|
| EP | 1 308 491 A2 | 5/2003 |
| JP | 2001-199151 | 7/2001 |
| JP | 2004-155868 | 6/2004 |
| JP | 3603311 | 10/2004 |
| JP | 2005-297549 | 10/2005 |
| JP | 2007-276387 | 10/2007 |
| JP | 2009-166387 | 7/2009 |
| JP | 2009-179061 | 8/2009 |
| JP | 2010-138094 | 6/2010 |
| JP | 2010-168433 | 8/2010 |
| JP | 2010-180332 | 8/2010 |
| JP | 2011-194882 | 10/2011 |
| WO | WO00/06390 | 2/2000 |
| WO | 2009/091079 | 7/2009 |

OTHER PUBLICATIONS

U.S. Appl. No. 14/000,281, filed Aug. 19, 2013, Fujii, et al.
U.S. Appl. No. 13/893,622, filed May 14, 2013, Gotou, et al.
International Search Report and Written Opinion issued Apr. 24, 2012 in PCT/JP2012/054486 filed Feb. 17, 2012.
Extended European Search Report issued Apr. 2, 2014, in European Patent Application No. 12746854.4.
Office Action and Search Report issued on May 5, 2014 in the corresponding Chinese Patent Application No. 201280009319.X (with English Translation).

* cited by examiner

INKJET TREATMENT LIQUID AND IMAGE FORMING METHOD USING TREATMENT LIQUID

CROSS REFERENCE TO RELATED APPLICATIONS

The present application is a 35 U.S.C. §371 national stage patent application of International patent application PCT/JP2012/054486, filed on Feb. 17, 2012, published as WO/2012/111855 on Aug. 23, 2012, the text of which is incorporated by reference, and claims the benefit of the filing date of Japanese application no. 2011-033832, filed on Feb. 18, 2011, the text of which is also incorporated by reference.

TECHNICAL FIELD

The present invention relates to an inkjet treatment liquid capable of maintaining its fluidity even being dried during a long-term storage, and relates to an image forming method using the treatment liquid.

BACKGROUND ART

An inkjet recording method has become rapidly popular in these days because it can record color images on plain paper and its running cost is low. However, the inkjet recording method has problems that image defects typified by character feathering (hereinafter, referred to as feathering) easily occur depending on the combination of an ink with a recording medium used, causing significant degradation in image quality.

Therefore, an attempt has been made to prevent feathering by suppressing the permeability of the ink. In this case, however, the drying properties of the ink degrade, which cause problems that the ink stains a hand as a resulting print is touched by the hand, or image smear occurs.

When a color image is recorded by the inkjet recording method, different color inks are sequentially superimposed one another. As a result, color inks bleed and are mixed together at the boundary parts of colors (hereinafter, referred to as color bleeding), and image quality significantly degrades.

To solve these problems, attempts have been made to prevent the color bleeding by increasing ink permeability. However, in this case, since a colorant penetrates inside the recording medium, image density degrades, and ink significantly strikes through to the back surface of the recording medium, failing to perform double face printing in a suitable manner.

To solve these problems and improve image quality, image forming methods using a treatment liquid and an ink have been proposed.

These proposed methods include, for example, a method for forming a coloring portion on a recording medium using a liquid composition in which particles, each surface of which is charged with the reverse polarity to that of an aqueous ink, are dispersed (see PTL 1), a method for performing printing by depositing an ink composition and a first liquid containing polymer particles on a recording medium for improving abrasion resistance of a resulting image formed product (see PTL 2), a method for improving image density and smear fixing ability of resulting images using a combination of a cationic polymer compound and organic acid (see PTL 3), a method for improving image density of resulting images by applying a highly viscous treatment liquid containing a cationic polymer compound (see PTL 4), and a method for improving a fixing ability of recorded images by specifying the viscosity of a treatment liquid containing amphoteric polymer compound, and the viscosity of a recording liquid containing a colorant to certain ranges (see PTL 5).

A roller coating device is used for an application of a treatment liquid. Since the roller coating device has a configuration having a combination of larger numbers of rollers, it is however difficult to seal the device completely. As a result, in the case where a device is not used over a long period of time, the treatment liquid may be deposited and solidified on a roller or in a tank, or may become viscous, which makes the application of the treatment liquid difficult.

As a measure for solving this problem, there are a method for sealing a tank with a rubber member (see PTL 6), and a method for increasing an amount of a moisturizing agent in an treatment liquid (see PTL 7). Even with the method for sealing the tank with the rubber member, however, it is impossible to completely prevent drying of the treatment liquid as these are many operation units in the device. Moreover, the method for increasing the amount of the moisturizing agent in the treatment liquid has side effects that the viscosity thereof increases, or an effect of improving the image density is weaken.

Considering the aforementioned problems, it is possible to provide an ink having low viscosity but high solvent concentration by using a cyclic compound such as N-methyl-2-pyrrolidone and γ-butyrolactone as a water-soluble solvent for use in a treatment liquid. However, these solvents have a safety problem, and therefore a final product using these solvents is restricted at the time of import or use.

There are not so many materials effective for solving the problem that a coating of a treatment liquid becomes difficult after the treatment liquid is dried by being left to stand over a long period.

CITATION LIST

Patent Literature

PTL 1: Japanese Patent Application Laid-Open (JP-A) No. 2001-199151
PTL 2: International Patent Application No. WO 00/06390
PTL 3: JP-A No. 2009-166387
PTL 4: JP-A No. 2007-276387
PTL 5: JP-A No. 2004-155868
PTL 6: JP-A No. 2009-179061
PTL 7: JP-A No. 2005-297549

SUMMARY OF INVENTION

Technical Problem

The present invention aims to solve the various problems in the art, and achieve the following object. The object of the present invention is to provide an inkjet treatment liquid that does not change its viscosity by being dried, and can maintain its fluidity even after being dried due to a long term storage, and to provide an image forming method using the treatment liquid.

Solution to Problem

The means for solving the aforementioned problems are as follows:
An inkjet treatment liquid, containing:
a water-soluble coagulant;
a water-soluble organic solvent;
water; and an amide compound represented by the following general formula:

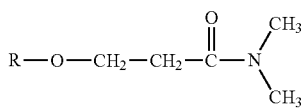

where R is a C1-C6 alkyl group.

Advantageous Effects of Invention

The present invention can provide an inkjet treatment liquid that does not change its viscosity by being dried, and can maintain its fluidity even after being dried due to a long term storage, and provide an image forming method using the treatment liquid. Moreover, the present invention realizes high quality image formations on plain paper.

DESCRIPTION OF EMBODIMENTS

Figure 1:
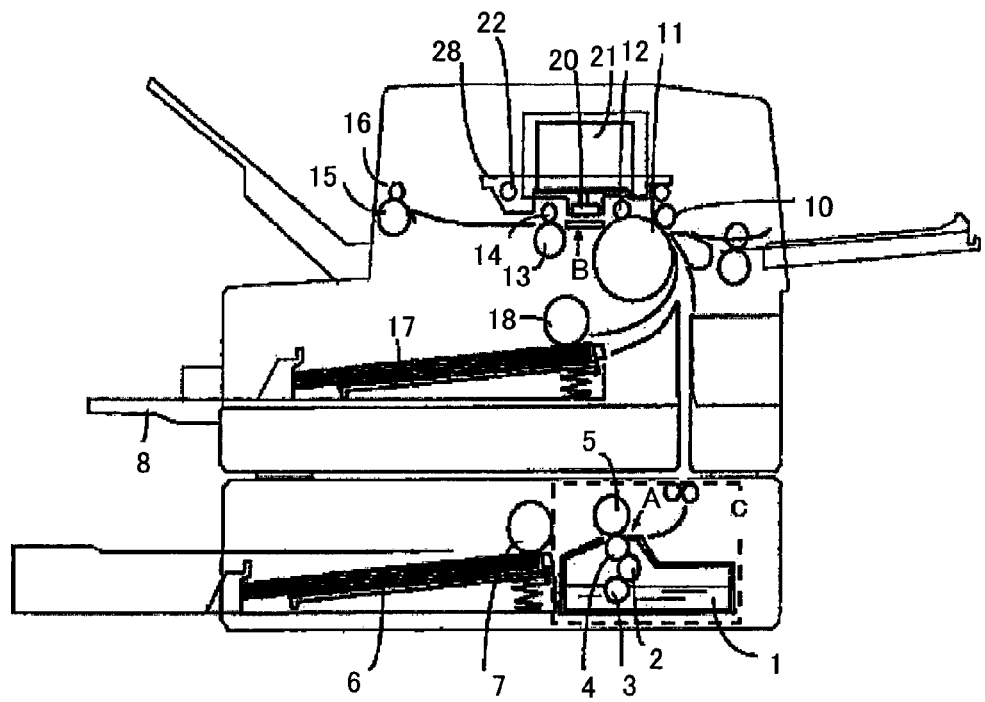
FIG. 1 is a diagram illustrating one example of an image forming apparatus.

The present invention will be specifically explained hereinafter.
(Inkjet Treatment Liquid)
The inkjet treatment liquid (may merely referred to as "treatment liquid" hereinafter) of the present invention contains at least a water-soluble coagulant, a water-soluble organic solvent, water, and an amide compound represented by the following general formula, and may further contain other components, if necessary.
By containing the amide compound in the treatment liquid, the fluidity of the treatment liquid can be maintained even when the moisture in the treatment liquid is evaporated. Moreover, the amide compound has characteristics that it can dissolve both a hydrophilic compound and a hydrophobic compound at the same time, it has a high equilibrium water content considering its relatively low molecular weight, and it has a high effect of suppressing evaporation of the moisture. Accordingly, use of the amide compound in the treatment liquid can contribute to prevent the viscosity change of the treatment liquid when the moisture thereof is evaporated.

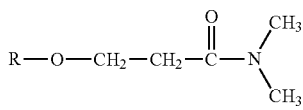

In the formula above, R is a C1-C6 alkyl group.
<Amide Compound>
The amide compound represented by the general formula (β-alkoxy-N,N-dimethyl propioneamide) is obtained by reacting N,N-dimethyl acrylamide with C1-C6 aliphatic monohydric alcohol (may also referred to as "lower monohydric alcohol" hereinafter).
The lower monohydric alcohol may have a straight chain structure or branched chain structure, and specific examples of the lower monohydric alcohol include methanol, ethanol, n-propanol, and n-butanol. Among them, methanol and ethanol are preferable, and methanol is particularly preferable. The reaction between N,N-dimethyl acrylamide and the lower monohydric alcohol is preferably carried out in the presence of base catalyst. The conditions of the reaction are appropriately selected depending on materials for use, and a catalyst for use, but the reaction temperature is typically selected from the range of 10° C. to 100° C. In the case where methanol is used as the lower monohydric alcohol and alkoxide of an alkali metal is used as the base catalyst, the reaction temperature is preferably 10° C. to 50° C., more preferably 10° C. to 40° C., and even more preferably 25° C. to 40° C. When the reaction temperature is very high, the yield may be reduced. When the reaction temperature is very low, the reaction speed reduces, and thus it is not practical. Moreover, these materials generally easily proceed to a reaction under normal pressure, and therefore it is economically advantageous. The duration of the reaction cannot be determined without conditions, as it is influenced by materials for use, a catalyst for use, and the reaction temperature, but it is typically 1 hour to 10 hours, preferably 2 hours to 5 hours.

R in the amide compound represented by the general formula is a C1-C6 alkyl group, preferably a methyl group, an ethyl group, a propyl group, or a butyl group, more preferably a methyl group or an ethyl group, and even more preferably a methyl group.

An amount of the amide compound in the treatment liquid is appropriately determined depending on the intended purpose without any restriction, but it is preferably about 10% by mass to 20% by mass.
<Water-Soluble Organic Solvent>
The water-soluble organic solvent is appropriately selected depending on the intended purpose without any restriction, and examples thereof include polyhydric alcohols, polyhydric alcohol alkyl ethers, polyhydric alcohol aryl ethers, a nitrogen-containing heterocyclic compound, amides, amines, a sulfur-containing compound, propylene carbonate, and ethylene carbonate. These may be used independently or in combination.

Moreover, use of the water-soluble organic solvent having high equilibrium water content can prevent moisture evaporation of the treatment liquid. Here, the water-soluble organic solvent having high equilibrium water content (referred to as a water-soluble organic solvent A hereinafter) means a water-soluble organic solvent having an equilibrium water content of 30% by mass or higher, preferably 40% by mass or higher in the environment of 23° C. and 80% RH. By using the water-soluble organic solvent A in the treatment liquid, increase in viscosity as a result of evaporation of the moisture during storage can be prevented. Furthermore, use of the amide compound represented by the general formula can prevent significant increase in the viscosity even after the moisture is evaporated from the treatment liquid.

Note that the term "equilibrium water content" means a water content when a mixture of a water-soluble organic solvent and water is released into the air at a certain temperature and a certain humidity, and the evaporation of water in the solution and absorption of water in the air into the organic solvent is in an equilibrium state. More specifically, an equilibrium water content can be measured using a potassium chloride-saturated aqueous solution and a desiccator. The internal temperature of the desiccator is maintained at 23° C.±1° C. and the internal humidity thereof is maintained at 80% RH±3% RH. Then, each sample of water-soluble organic solvents is weighed 1 g and poured in a petri dish, and the petri dish is placed in the desiccator and stored until there is no more change in mass of the sample, and an equilibrium water content of the sample can be determined by the following equation.

Equilibrium Water Content (%)=Amount of water absorbed into organic solvent/(Amount of organic solvent+Amount of water absorbed into organic solvent)×100

Preferable examples of the water-soluble organic solvent A include polyhydric alcohols having the equilibrium water content of 30% by mass or higher in the environment of 23° C. and 80% RH. Specific examples thereof include 1,2,3-butanetriol (38% by mass), 1,2,4-butanetriol (41% by mass), glycerin (49% by mass), diglycerin (38% by mass), triethyleneglycol (39% by mass), tetraethyleneglycol (37% by mass), diethyleneglycol (43% by mass), and 1,3-butanediol (35% by mass). Among them, glycerin and 1,3-butanediol are particularly preferably used because these solvents can reduce the viscosity of the treatment liquid when the treatment liquid absorbs moisture. It is preferred that the water-soluble organic solvent A be contained in an amount of 50% by mass or larger relative to the total amount of the water-soluble organic solvent because the ejection stability can be secured, and waste ink deposition in a maintenance device of an inkjet device can be desirably prevented.

An amount of the water-soluble organic solvent A in the treatment liquid is appropriately determined depending on the intended purpose without any restriction, but it is preferably about 5% by mass to about 30% by mass.

The treatment liquid of the present invention optionally contains a water-soluble organic solvent having an equilibrium water content of less than 30% by mass in the environment of 23° C. and 80% RH (referred to as a water-soluble organic solvent B hereinafter) replacing part of the water-soluble organic solvent A, or in combination with the water-soluble organic solvent A.

The water-soluble organic solvent B is appropriately selected depending on the intended purpose without any restriction. Examples of the water-soluble organic solvent B include polyhydric alcohols, polyhydric alcohol alkyl ethers, polyhydric alcohol aryl ethers, a nitrogen-containing heterocyclic compound, amides, amines, a sulfur-containing compound, propylene carbonate, ethylene carbonate, and other water-soluble organic solvents. These may be used independently or in combination.

Examples of the polyhydric alcohols include ethylene glycol, polyethylene glycol, propylene glycol, dipropylene glycol, tripropylene glycol, polypropylene glycol, 3-methyl-1,3-butanediol, 1,5-pentanediol, 2-methyl-2,4-pentanediol, hexylene glycol, 1,6-hexanediol, 1,2,6-hexanetriol, trimethylol ethane, trimethylol propane, 3-methyl-1,3-hexanediol, and propylpropylene diglycol.

Examples of the polyhydric alcohol alkyl ethers ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, propylene glycol monoethyl ether, and triethylene glycol dimethyl ether.

Examples of the polyhydric alcohol aryl ethers include ethylene glycol monophenyl ether, and ethylene glycol monobenzyl ether.

Examples of the nitrogen-containing heterocyclic compounds include 2-pyrrolidone, N-methyl-2-pyrrolidone, 1,3-dimethyl-2-imidazolidionone, ε-caprolactam, and γ-butyrolactone.

Examples of the amides include formamide, N-methylformamide, N,N-dimethylformamide, and N,N-diethylformamide.

Examples of the amines include monoethanol amine, diethanol amine, triethanol amine, N,N-dimethyl monoethanol amine, N-methyl diethanol amine, N-methyl ethanol amine, N-phenyl ethanol amine, and 3-aminopropyldiethylamine.

Examples of the sulfur-containing compound include dimethyl sulfoxide, sulfolane, and thiodiglycol.

A ratio of the water-soluble organic solvent B to the water-soluble organic solvent A is preferably about 0% by mass to about 300% by mass.

<Water-Soluble Coagulant>

The water-soluble coagulant is appropriately selected depending on the intended purpose without any restriction, and examples thereof include a water-soluble aliphatic organic acid, an ammonium salt of a water-soluble aliphatic organic acid, a water-soluble metal salt, and a water-soluble cationic polymer. These may be used independently or in combination.

By adding the water-soluble coagulant to the inkjet treatment liquid, a pigment contained in an ink tends to retained on a surface of a recording medium, which improves salting-out effect, to thereby increasing image density of a resulting image. The pH of the inkjet treatment liquid is typically set low. When the inkjet treatment liquid is in contact with an inkjet recording ink, anionic pigment particles are coagulated (acid deposition) to fix on a recording medium, thereby causing less feathering, and color bleeding.

An amount of the water-soluble coagulant is appropriately determined depending on the intended purpose without any restriction, but it is preferably 0.1% by mass to 30% by mass, more preferably 1% by mass to 20% by mass relative to the total amount of the treatment liquid. When the amount thereof is larger than 30% by mass, the water-soluble aliphatic organic acid is not sufficiently dissolved in the treatment liquid, and is sometimes precipitated. When the amount thereof is smaller than 0.1% by mass, the obtainable effect of increasing the image density may not be sufficiently exhibited.

Examples of the water-soluble aliphatic organic acid include lactic acid (pKa: 3.83), malic acid (pKa: 3.4), citric acid (pKa: 3.13), tartaric acid (pKa: 2.93), oxalic acid (pKa: 1.04), malonic acid (pKa: 2.05), succinic acid (pKa: 4.21), adipic acid (pKa: 4.42), acetic acid (pKa: 4.76), propionic acid (pKa: 4.87), butyric acid (pKa: 4.82), valeric acid (pKa: 4.82), gluconic acid (pKa: 2.2), pyruvic acid (pKa: 2.49), and fumaric acid (pKa: 3.02).

Examples of the ammonium salt of the water-soluble aliphatic organic acid include ammonium acetate, ammonium lactate, ammonium propionate, and ammonium succinate.

Examples of the water-soluble metal salt include a water-soluble divalent metal salt and a water-soluble monovalent alkali metal salt. Examples of the water-soluble divalent metal salt include magnesium sulfate, aluminum sulfate, manganese sulfate, nickel sulfate, iron(II) sulfate, copper(II) sulfate, zinc sulfate, iron(II) nitrate, cobalt nitrate, strontium nitrate, copper(II) nitrate, nickel(II) nitrate, lead(II) nitrate, manganese(II) nitrate, nickel(II) chloride, calcium chloride, tin(II) chloride, strontium chloride, barium chloride, magnesium chloride, calcium lactate, and calcium nitrate.

Examples of the water-soluble monovalent alkali metal salt include sodium sulfate, potassium sulfate, lithium sulfate, sodium hydrogen sulfate, potassium hydrogen sulfate, sodium nitrate, potassium nitrate, sodium carbonate, potassium carbonate, sodium carbonate, potassium hydrogen carbonate, sodium chloride, and potassium chloride.

The water-soluble cationic polymer is preferably a cationic polymer of a quaternary ammonium salt, and examples thereof include a dialkyl allyl ammonium chloride polymer, a dialkyl aminoethyl (meth)acrylate quaternary ammonium salt polymer, a modified polyvinyl alcohol dialkyl ammonium salt polymer and a dialkyl diallyl ammonium salt polymer.

Other examples of the water-soluble cationic polymer include cationic epichlorohydrin condensate, a cationic specially-modified polyamine compound, a cationic polyamide polyamine compound, a cationic urea-formalin resin compound, a cationic polyacrylamide compound, cationic alkyl ketene dimmer, a cationic dicyandiamide compound, a cationic dicyandiamide-formalin condensation compound, a cationic dicyandiamide-polyamine condensation compound, a cationic polyvinyl formamide compound, a cationic polyvinyl pyridine compound, a cationic polyalkylene polyamine compound and a cationic epoxy polyamide compound.

Among these water-soluble coagulants above, at least one selected from the group consisting of the water-soluble aliphatic organic acid, the ammonium salt of the water-soluble aliphatic organic acid, and the cationic polymer is preferable, and the compounds having any of the structures represented by the following formula are particularly preferable.

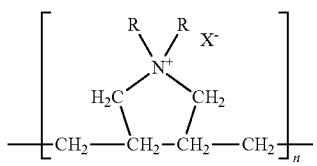

In the formula above, each R is independently a methyl group or an ethyl group, $X^-$ is a halogen ion, and n denotes a natural number.

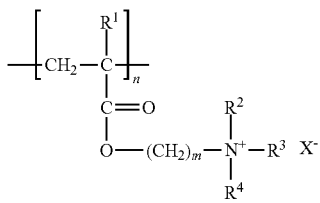

In the formula above, $X^-$ is a halogen ion, a nitric acid ion, a nitrous acid ion, or an acetic acid ion, $R^1$ is H or $CH_3$, $R^2$ to $R^4$ are each independently H or an alkyl group, n is a natural number, and m is an integer of 1 to 3.

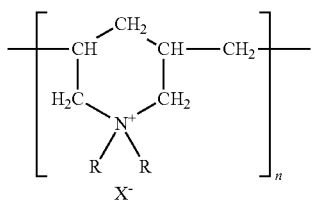

In the formula above, each R is independently a methyl group or an ethyl group, X— is a halogen ion, a nitric acid ion, a nitrous acid ion, or an acetic ion, and n is a natural number.

The water-soluble cationic polymer can increase the image density and reduce bleeding of printed characters by aggregating the colorant and water-dispersible resin to leave the colorant on a surface of plain paper.

<Surfactant>

The treatment liquid of the present invention preferably contains a surfactant. The surfactant is selected from those having excellent storage stability, low surface tension, high penetration ability and high leveling ability, depending on a combination of the water-soluble coagulant and the water-soluble organic solvent. Examples of the surfactant include an anionic surfactant, a nonionic surfactant, a silicone surfactant, and a fluorosurfactant. Among them, the silicone surfactant and fluorosurfactant are particularly preferable. These surfactants may be used independently, or in combination.

Specific examples of the surfactant include: SURFLON S-111, S-112, S-113, S-121, S-131, S-132, S-141, and S-145 (all of which are manufactured by Asahi Glass Co., Ltd.); FLUORAD FC-93, FC-95, FC-98, FC-129, FC-135, FC-170C, FC-430, FC-431, and FC-4430 (all of which are manufactured by Sumitomo 3M Limited); MEGAFACE F-470, F-1405, F-474 (all of which are manufactured by DIC Corporation); ZONYL FS-300, FSN, FSN-100, and FSO (all of which are manufactured by E.I. du Pont de Nemours & Company); EFTOP EF-351, EF-352, EF-801, and EF-802 (all of which are manufactured by Mitsubishi Materials Electronic Chemicals Co., Ltd.); and SOFTANOL EP-7025 (manufactured by Nippon Shokubai Co., Ltd.). Among them, ZONYL FS-300, FSN, FSN-100, and FSO which have high reliability and ability for improving a coloring ability are particularly preferable.

An amount of the surfactant in the treatment liquid is appropriately determined depending on the intended purpose without any restriction, but it is preferably 0.01% by mass to 3.0% by mass, more preferably 0.5% by mass to 2% by mass. When the amount thereof is smaller than 0.01% by mass, the effect obtainable by adding the surfactant cannot be exhibited. When the amount thereof is larger than 3.0% by mass, use of the surfactant in such the amount may adversely affect the storage stability.

<Other Components>

The treatment liquid of the present invention may contain other components, such as a penetrating agent, and a wetting agent, and a preservative, an anti-rust agent, and an antifungal agent that are used in the inkjet recording ink described later.

The penetrating agent preferably contains a C8-C11 non-wettable polyol or glycol ether. Among them, the penetrating agent having a solubility of 0.2% by mass to 5.0% by mass to water of 25° C. is preferable, and 2-ethyl-1,3-hexanediol [solubility: 4.2% (25° C.)], and 2,2,4-trimethyl-1,3-pentanediol [solubility: 2.0% (25° C.)] are particularly preferable.

Other examples of the non-wettable polyol include 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexane-1,2-diol.

Other penetrating agents that can be used in combination are appropriately selected depending on the intended purpose without any restriction, provided that they can be dissolved in the ink and can adjust the physical properties of the ink to the desirable properties. Examples thereof include: alkyl or aryl ethers of polyhydric alcohols such as diethylene glycol monophenyl ether, ethylene glycol monophenyl ether, ethyleneglycol monoallyl ether, diethylene glycol monophenyl ether, diethylene glycol monobutyl ether, propylene glycol monobutyl ether, and tetraethylene glycol chlorphenyl ether; and lower alcohols such as ethanol.

An amount of the penetrating agent in the treatment liquid is appropriately determined depending on the intended purpose without any restriction, but it is preferably 0.1% by mass to 5.0% by mass. When the amount thereof is smaller than 0.1% by mass, the effect of penetrating the ink may not be exhibited. When the amount thereof is larger than 5.0% by mass, the penetrating agent is separated from the solvent due to its low solubility to the solvent, so that the effect for improving the penetrating ability may be saturated.

The wetting agent is appropriately selected from the aforementioned water-soluble organic solvents, and other examples of the wetting agent include saccharides.

The saccharides are appropriately selected depending on the intended purpose without any restriction, and examples thereof include monosaccharides, disaccharides, oligosaccharides (including trisaccharides, and tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the above-mentioned polysaccharides mean saccharides in a broad sense, which may include materials existing widely in nature, such as α-cyclodextrin and cellulose. Moreover, other examples include derivatives of saccharides such as reducing sugars of saccharides (for example, sugar alcohol, which is represented by the general formula: $HOCH_2(CHOH)_nCH_2OH$, where n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

(Image Forming Method)

The image forming method of the present invention contains applying the inkjet treatment liquid onto a surface of the recording medium (a coating step), and ejecting an inkjet recording ink containing a colorant, a water-soluble organic solvent, and water corresponding to an imaging signal to form an image on the surface of the recording medium which has been subjected to the coating step (an image forming step), and may further contain other steps, if necessary.

<Coating Step>

The coating step is applying the inkjet treatment liquid onto a surface a recording medium.

<<Recording Medium>>

As for the recording medium, plain paper that does not have a coating layer is suitably used. Preferable examples of the recording medium include plain paper having size of 10 seconds or more and air permeability of 5 seconds to 50 seconds, which is commonly used as photocopy paper.

Note that, the size of the recording medium can be measured by a Stockigt sizing degree testing method for paper (JIS P8122-76).

Moreover, the air permeability thereof can be measured by an air permeability testing method for paper and cardboard (JIS P8117-80).

The coating step is not restricted as long as it contains uniformly applying the treatment liquid onto a surface of a recording medium. Examples of the coating (application) method include blade coating, gravure coating, gravure offset coating, bar coating, roller coating, knife coating, air knife coating, comma coating, U-comma coating, AKKU coating, smoothing coating, microgravure coating, reverse roller coating, four-roller or five-roller coating, dip coating, curtain coating, slide coating, and die coating.

A coating amount of the treatment liquid on a recording medium in the coating step is preferably 0.1 $g/m^2$ to 30.0 $g/m^2$, and more preferably 0.2 $g/m^2$ to 10.0 $g/m^2$ on wet basis. When the coating amount is less than 0.1 $g/m^2$, almost no improvement in image quality (image density, color saturation, color bleeding resistance, feathering resistance and resistance to causing white spot) may not be observed. When the coating amount is more than 30.0 $g/m^2$, the texture as plain paper may be impaired, and paper curling may occur.

<Image Forming Step (Ink Jetting Step)>

The image forming step (which may be also referred to as the ink jetting step) is ejecting the inkjet recording ink containing a colorant, a water-soluble organic solvent, and water corresponding to imaging signal to form an image on a surface of a recording medium which has been subjected to the coating step. The ejecting is carried out by applying stimuli (energy) to an ink to make the ink jet onto the recording medium.

As for the method for making the ink jet to the recording medium to form an image, any inkjet recording methods known in the art can be applied. Examples of the method include an inkjet recording method in which scanning is performed with a head, and an inkjet recording method using linearly aligned heads to perform image recording on certain sheets of recording media.

The driving method of a recording head, which is an ink jetting unit, is not particularly restricted in the ink jetting step. It is possible to use a piezo-electric device actuator using a PZT-based material, a method of effecting thermal energy, and an on-demand type head utilizing an actuator, etc utilizing an electrostatic force, and it is also possible to perform recording with a charge-controllable head of continuous-jetting type. In the method of effecting thermal energy, it is difficult to control jetting of droplets, and images on recording media tend to significantly vary, depending on types of the recording media. However, these problems are solved by applying the treatment liquid to the recording media, and stable, high quality images can be obtained regardless of the types of the recording media.

<<Inkjet Recording Ink>>

The inkjet recording ink (may also be referred to as "an ink" hereinafter) for use in the image forming method of the present invention contains at least a colorant, a water-soluble organic solvent, and water, preferably further contains a surfactant and a penetrating agent, and may further contain other component, if necessary.

Colorant

The colorant in the ink is appropriately selected depending on the intended purpose without any restriction, but it is preferably a water-dispersible colorant. As for the water-dispersible colorant, a pigment is mainly used in view of its weather resistance, but it may also contain a dye for controlling a color tone of the ink, as long as the dye does not adversely affect the weather resistance of the ink.

The pigment is appropriately selected depending on the intended purpose without any restriction. An inorganic or organic pigment for black or color can be used as the pigment. The pigment may be used independently, or in combination.

Examples of the inorganic pigment include titanium oxide, iron oxide, calcium carbonate, barium sulfate, aluminum hydroxide, barium yellow, cadmium red and chrome yellow. Moreover, it is possible to use carbon blacks produced by a known method such as a contact method, furnace method and thermal method.

As the organic pigments, it is possible to use azo pigments (including azo lake, insoluble azo pigments, condensed azo pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, and aniline black.

Among these, the pigments having high affinity with water are particularly preferably used.

Specific examples of the preferable pigments for use include, as a black pigment, carbon blacks (e.g., furnace black, lamp black, acetylene black, and channel black (C.I. Pigment Black 7)); metal-based pigments (e.g., copper, iron (C.I. Pigment Black 11), and titanium oxide); and organic pigments (e.g., aniline black (C.I. Pigment Black 1)).

Specific examples of the preferable pigments for use include, as a color pigment, C.I. Pigment Yellow 1, 3, 12, 13, 14, 17, 24, 34, 35, 37, 42 (yellow iron oxides), 53, 55, 74, 81, 83, 95, 97, 98, 100, 101, 104, 408, 109, 110, 117, 120, 128, 138, 150, 151, 153 and 183; C.I. Pigment Orange 5, 13, 16, 17, 36, 43, and 51; C.I. Pigment Red 1, 2, 3, 5, 17, 22, 23, 31, 38, 48:2 and 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209 and 219; C.I. Pigment Violet 1 (Rhodamine Lake), 3, 5:1, 16, 19, 23 and 38; C.I. Pigment Blue 1, 2, 15, 15:1, 15:2 and 15:3 (Phthalocyanine Blue), 16, 17:1, 56, 60 and 63; and C.I. Pigment Green 1, 4, 7, 8, 10, 17, 18 and 36.

The preferable embodiments, in the case where the water-dispersible colorant is a pigment, include the following first and second embodiments (1), (2):

(1) in a first embodiment, the water-dispersible colorant contains a polymer emulsion in which a water-insoluble or sparsely soluble coloring material is contained in polymer fine particles (i.e., a water dispersion of polymer fine particles containing a color material).

(2) in a second embodiment, the water-dispersible colorant contains a pigment having at least one hydrophilic group on its surface and exhibiting water-dispersibility in the absence of a dispersant (hereinafter, also referred to as "self-dispersible pigment".

In the present invention, in the case of the second embodiment, the colorant preferably contains a water-dispersible resin described below.

As the water-dispersible colorant of the first embodiment, a polymer emulsion obtained by containing a pigment in polymer fine particles is preferably used, in addition to the above-mentioned pigments. The polymer emulsion obtained by containing a pigment in polymer fine particles is an emulsion in which a pigment is encapsulated in polymer fine particles or a pigment is adsorbed on the surface of each of polymer fine particles. In this case, all pigment particles are not necessarily encapsulated in or adsorbed on the surface of the pigment. That is, the pigment may be dispersed in an emulsion in the range not impairing the effects of the present invention. Examples of the polymer forming emulsion (polymer in the polymer fine particles) include vinyl polymers, polyester polymers, and polyurethane polymers. Polymers particularly preferably used are vinyl polymers and polyester polymers. For example, the polymers disclosed in Japanese Patent Application Laid-Open (JP-A) Nos. 2000-53897 and 2001-139849 can be used.

The self-dispersible pigment described in the second embodiment is a pigment whose surface has been modified so that at least one hydrophilic group is, directly or via another atom group, combined with the surface of the pigment. To achieve the surface modification, for example, the following methods are employed: a method in which a specific functional group (functional group such as a sulfone group and a carboxyl group) is chemically combined with the surface of a pigment, or a method in which the surface of a pigment is subjected to wet oxidization treatment using at least one of a hypohalous acid or a salt thereof. Among these methods, a form is particularly preferable in which a carboxyl group is combined with the surface of a pigment and the pigment is dispersed in water. Since the surface of a pigment is modified and a carboxyl group is combined with the surface of the pigment, not only the dispersion stability but also higher print quality can be obtained, and the water resistance of the recording medium after printing is further improved.

An ink containing the self-dispersible pigment of the second embodiment is excellent in re-dispersibility after being died, and thus the ink allows for suitable and easy recording with a simple cleaning operation, without causing nozzle clogging, even when the cleaning operation is stopped for a long period and water contained in ink near inkjet head nozzles is evaporated.

The volume average particle diameter ($D_{50}$) of the self-dispersible pigment is preferably 0.01 μm to 0.16 μm in the ink.

As the self-dispersible carbon black, a self-dispersible carbon black having ionicity is preferable, and an anionically charged-self-dispersible carbon black is particularly preferable.

Examples of the anionic hydrophilic group include —COOM, —SO$_3$M, —PO$_3$HM, and —PO$_3$M$_2$ (where M is an alkali metal, ammonium or organic ammonium). Among them, —COOM, and —SO$_3$M, each of which is combined with the surface of a color pigment, are preferable. Examples of the alkali metal denoted by M include lithium, sodium and potassium. Examples of the organic ammonium denoted by M include monomethyl ammonium to trimethyl ammonium, monoethyl ammonium to triethyl ammonium, and monomethanol ammonium to trimethanol ammonium.

As a method of obtaining the anionically charged color pigment, there are, for example, a method for oxidizing a color pigment with sodium hypochlorite, a method for sulfonating a color pigment, and a method in which a color pigment is reacted with the diazonium salt.

The hydrophilic group may be combined with the surface of carbon black via another atom groups. Examples of another atom groups include a C1-C12 alkyl group, a phenyl group that may have a substituent, and a naphthyl group that may have a substituent.

Specific examples of the bond between the hydrophilic group with a surface of carbon black via another atom group include —C$_2$H$_4$COOM (whew M is an alkali metal or quaternary ammonium), and -PhSO$_3$M (where Ph is a phenyl group, and M is an alkali metal or quaternary ammonium).

An amount of the colorant in the ink is preferably 2 to 15% by mass, more preferably 3 to 12% by mass on solid basis. When the amount of the colorant is smaller than 2% by mass, the coloring ability of the resulting ink and the resulting image density may be low. When the amount thereof is larger than 15% by mass, the viscosity of the resulting ink increases, which may lead to the poor ejecting properties of the ink, and hence not preferable.

Water-Soluble Organic Solvent

The water-soluble organic solvent used in the ink is suitably the same water-soluble organic solvent to that used in the treatment liquid. As for the water-soluble organic solvent, the water-soluble organic solvent A having a high equilibrium water content is particularly preferable. A mass ratio of the water-dispersible colorant and water-soluble organic solvent in the ink affects the ejection stability of the ink from a head. When the solids content of the water-dispersible colorant is large considering that the formulated amount of the water-soluble organic solvent is small, for example, evaporation of the moisture of the ink near the ink meniscus of nozzles proceeds, and as a result, ejection defects may be caused.

An amount of the water-soluble organic solvent in the ink is preferably 20% by mass to 50% by mass, more preferably 20% by mass to 45% by mass. When the amount thereof is smaller than 20% by mass, the ejection stability of the ink may be deteriorated, or the waste ink may be deposited in a maintenance device of the inkjet recording device. When the amount thereof is larger than 50% by mass, the drying properties of the ink on paper is poor, and the qualities of printed characters on plain paper may be lowered.

Surfactant

The surfactant for use in the ink is selected depending on a colorant for use, and a combination with the water-soluble organic solvent, but it is preferably a surfactant which does not adversely affect dispersion stability, has low surface tension, and high penetrating ability and leveling ability. Preferable examples thereof include an anionic surfactant, a nonionic surfactant, a silicone surfactant, and a fluorosurfactant. Among them, the silicone surfactant and fluorosurfactant are particularly preferable. These surfactants may be used independently, or in combination.

Specific examples of the surfactant are those listed as the surfactant for use in the treatment liquid described earlier.

An amount of the surfactant in the ink is preferably 0.01% by mass to 3.0% by mass, more preferably 0.5% by mass to 2% by mass. When the amount thereof is smaller than 0.01% by mass, an obtainable effect by adding the surfactant may not be exhibited. When the amount thereof is larger than 3.0% by mass, the penetrating ability of the ink to a recording medium becomes higher than necessary, which may cause reduction in image density of a resulting image, or strike through.

Penetrating Agent

The penetrating agent for use in the ink preferably includes those described as the penetrating agent used in the treatment liquid.

An amount of the penetrating agent in the ink is preferably 0.1% by mass to 4.0% by mass. When the amount thereof is smaller than 0.1% by mass, the desirable drying speed of the ink cannot be attained to thereby produce a blurred image. When the amount thereof is larger than 4.0% by mass, the dispersion stability of the colorant is impaired so that nozzle clogging tends to occur, or the penetrating ability of the ink to a recording medium becomes higher than necessary, which may cause reduction in image density of a resulting image, or strike through.

Water-Dispersible Resin

As for the water-dispersible resin for use in the ink, a water-dispersible resin having excellent film formability (image formability) and having high water repellency, high water resistance, and high weather resistance is effective for image recording. Examples of the water-dispersible resin include a condensed synthetic resin, an addition synthetic resin and a natural polymer compound.

Examples of the condensed synthetic resin include a polyester resin, a polyurethane resin, a polyepoxy resin, a polyamide resin, a polyether resin, a poly(meth)acrylic resin, an acryl-silicone resin, and a fluororesin.

Examples of the addition synthetic resin include a polyolefin resin, a polystyrene resin, a polyvinyl alcohol resin, a polyvinyl ester resin, a polyacrylic acid resin, and an unsaturated carboxylic acid resin.

Examples of the natural polymer compound include cellulose, rosin, and natural rubbers.

Among them, polyurethane resin particles, acryl-silicone resin particles, and fluororesin particles are particularly preferable. Two or more of these water-dispersible resins may be used in combination, without any particular problems.

As for the fluororesin particles, fluororesin particles having fluoroolefin unit are preferable. Among them, fluorine-containing vinyl ether resin particles containing a fluoroolefin unit and a vinyl ether unit are particularly preferable.

The fluoroolefin unit is appropriately selected depending on the intended purpose without any restriction, and examples thereof include —$CF_2CF_2$—, —$CF_2CF(CF_3)$—, and —$CF_2CFCl$—.

The vinyl ether unit is appropriately selected depending on the intended purpose without any restriction, and examples thereof include the units represented by the following structural formulae:

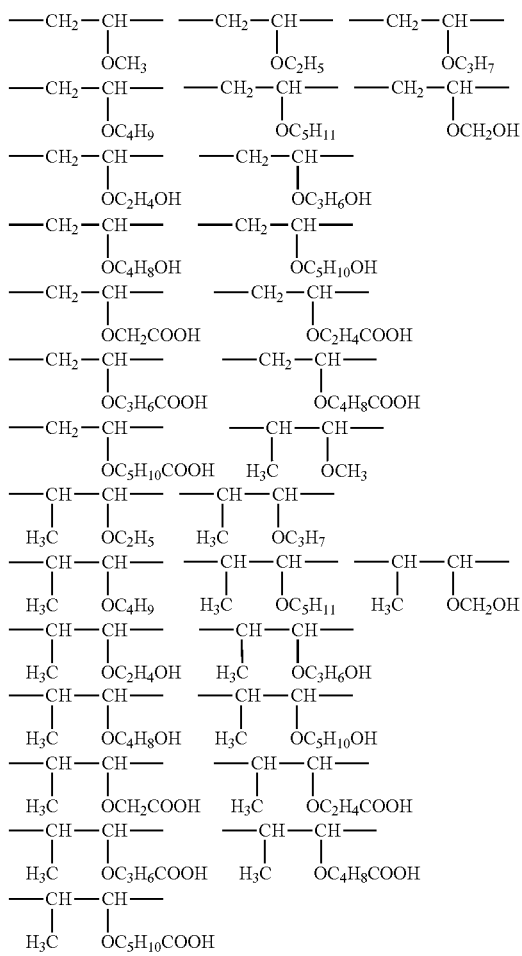

As the fluorine-containing vinyl ether resin particles each containing a fluoroolefin unit and a vinyl ether unit, an alternated copolymer, in which the fluoroolefin unit and the vinyl ether unit are alternately copolymerized, is preferable.

These fluororesin particles may be appropriately synthesized, or selected from commercial products. Examples of the commercial products thereof include: FLUONATE FEM-500 and FEM-600, DICGUARD F-52S, F-90, F-90M, F-90N and AQUAFURFURAN TE-5A manufactured by Dainippon Ink Chemical Industries Co., Ltd.; LUMIFLON FE4300, FE4500, FE4400, ASAHI GUARD AG-7105, AG-950, AG-7600, AG-7000, and AG-1100 manufactured by Asahi Glass Co., Ltd.

As for the water-dispersible resin, a homopolymer may be used, or a copolymer may be used. Moreover, the water-dispersible resin for use may have a monophase structure or core-shell structure, or may be prepared by power-feed emulsion.

As the water-dispersible resin, it is possible to use a resin itself having a hydrophilic group and self-dispersibility, and a resin itself having no dispersibility but to which the dispersibility is imparted with use of a surfactant and another resin having a hydrophilic group. Among these resins, an ionomer of a polyester resin or a polyurethane resin, or an emulsion of resin fine particles obtained by emulsification polymerization or suspension polymerization of an unsaturated monomer is most suitably used.

In the case of emulsification polymerization of the unsaturated monomer, a resin emulsion is obtained by reacting water into which an unsaturated monomer, a polymerization initiator, a surfactant, a chain transfer agent, a chelating agent and a pH adjustor are added. Thus, a water-dispersible resin can be easily obtained, and desired properties are easily obtained because the resin components can be changed.

Examples of the unsaturated monomer include unsaturated carboxylic acids, monofunctional or polyfunctional (meth)acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons. These may be used independently, or in combination. By combining these monomers, properties of the resulting resin can be flexibly modified. The properties of the resulting resin can also be modified with use of an oligomer type polymerization initiator, through a polymerization reaction or graft reaction.

Examples of the unsaturated carboxylic acids include acrylic acid, methacrylic acid, itaconic acid, fumaric acid, and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, domethylaminoethyl methacrylate, methacryloxyethyltrimethyl ammonium salt, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethyl ammonium salt.

Examples of the polyfunctional (meth)acrylic acid monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane, trimethylol propane triacrylate, trimethylol ethane triacrylate, tetramethylol ethane triacrylate, ditrimethylol tetraacrylate, tetramethylol methane tetraacrylate, pentaerythritol tetraacrylate, and dipentaerythritol hexaacrylate.

Examples of the (meth)acrylic acid amide monomers include acrylamide, methacrylamide, N,N-dimethylacrylamide, methylene-bis-acrylamide, and 2-acrylamide-2-methylpropane sulfonic acid.

Examples of the aromatic vinyl monomers include styrene, α-methylstyrene, vinyltoluene, 4-t-butylstyrene, chlorostyrene, vinylanisole, vinylnaphthalene, and divinylbenzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinylpyrrolidone, vinyl sulfonic acid or salts thereof, vinyltrimethoxysilane, and vinyltriethoxysilane.

Examples of the allyl compound monomers include allylsulfonic acid or salts thereof, allylamine, ally chloride, diallylamine, and diallyldimethylammonium salts.

Examples of the olefin monomers include ethylene, and propylene.

Examples of the diene monomers include butadiene, and chloroprene.

Examples of the oligomers having unsaturated carbon atoms include styrene oligomers having methacryloyl groups, styrene-acrylonitrile oligomers having methacryloyl groups, methyl methacrylate oligomers having methacryloyl groups, dimethyl siloxane oligomers having methacryloyl groups, and polyester oligomers having acryloyl groups.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with water-dispersible colorants, it is more preferably 6 to 11, and still more preferably 7 to 9.

The average particle diameter ($D_{50}$) of the water-dispersible resin is relevant to the viscosity of the dispersion liquid. In the case of water-dispersible resins having the same composition, the smaller the particle diameter becomes, the higher the viscosity is at the same solid content. The average particle diameter ($D_{50}$) of the water-dispersible resin is preferably 50 nm or larger to prevent the resulting ink from having excessively high viscosity. When the average particle diameter is several tens micrometers, the water-dispersible resin cannot be used because the diameter of the water-dispersible resin is greater than that of nozzle holes of an inkjet head. When the diameter of the water-dispersible resin is smaller than that of nozzle holes but particles having large particle diameters are present in an ink, the ink ejection stability degrades. In order not to impair the ink ejection stability, the average particle diameter ($D_{50}$) of the water-dispersible resin is preferably 200 nm or smaller, and more preferably 150 nm or smaller.

The water-dispersible resin preferably has a function to fix the water-dispersible colorant on the surface of paper, to form a coat at normal temperature and to improve fixability of the colorant. Therefore, the minimum film forming temperature (MFT) of the water-dispersible resin is preferably 30° C. or lower. Further, when the glass transition temperature of the water-dispersible resin is −40° C. or lower, tucks occur in printed matters because of the increased viscosity of the resin coat. Thus, the water-dispersible resin preferably has a glass transition temperature of −30° C. or higher.

The amount of the water-dispersible resin contained in the ink is preferably 1% by mass to 15% by mass, and more preferably 2% by mass to 7% by mass on solid basis.

The solid content of the ink can be determined by a method of separating only the water-dispersible colorant and the water-dispersible resin from the ink. In addition, when a pigment is used as the water-dispersible colorant, a mass reduction ratio of the resulting ink is evaluated through a thermal mass analysis, thereby making it possible to measure a mass ratio between the water-dispersible colorant and the water-dispersible resin. When the molecular structure of the water-dispersible colorant is apparently known, in the case where the colorant is a pigment or dye, it is possible to determine the solid content of the colorant using the NMR; in the case where the colorant is an inorganic pigment contained in heavy metal atoms and molecular skeleton, or a metal-containing organic pigment or metal-containing dye, the solid content of the colorant can be determined using the fluorescent X-ray analysis.

Other Components

Other components to be contained in the inkjet recording ink are appropriately selected depending on the intended purpose without any restriction, and examples thereof include a pH regulator, an antiseptic/antifungal agent, a chelating reagent, an anti-rust agent, an antioxidant, an ultraviolet absorber, an oxygen absorber, and a light stabilizer.

The pH regulator is appropriately selected depending on the intended purpose without any restriction, provided that it does not adversely affect an ink to be prepared, and can adjust pH of the ink to 7 to 11. Examples of the pH regulator include alcohol amines, hydroxides of alkali metal elements, hydroxides of ammonium, phosphonium hydroxides, and carbonates of alkali metals.

When the pH of the inkjet ink is lower than 7 or higher than 11, problems such as degeneration and leakage of ink and ejection defects may occur due to the large amount of ink dissolving an inkjet head and an ink supply unit used.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide, and quaternary ammonium hydroxide.

Examples of the phosphonium hydroxides include quaternary phosphonium hydroxide.

Examples of the carbonates of alkali metals include lithium carbonate, sodium carbonate, and potassium carbonate.

Examples of the antiseptic/antifungal agent include sodium dehydroacetate, sodium sorbate, sodium 2-pyridinethiol-1-oxide, sodium benzoate, and sodium pentachlorophenol.

Examples of the chelating agent include sodium ethylenediamine tetraacetate, sodium nitrilotriacetate, sodium hydroxyethylethylenediamine triacetate, sodium diethylenetriamine pentaacetate, and sodium uramil diacetate.

Examples of the anti-rust agent include acid sulfite, sodium thiosulfate, thiodiglycolic acid ammonium, diisopropyl ammonium nitrate, pentaerythritol tetranitrate, and dicyclohexyl ammonium nitrate.

Examples of the antioxidant include phenolic antioxidants (including hindered phenolic antioxidant), amine antioxidants, sulfuric antioxidants, and phosphoric antioxidants.

Examples of the ultraviolet absorber include benzophenone ultraviolet absorbers, benzotriazole ultraviolet absorbers, salicylate ultraviolet absorbers, cyanoacrylate ultraviolet absorbers, and nickel complex salt ultraviolet absorbers.

—Preparation Method of Ink—

The ink is produced by dispersing or dissolving the water-dispersible colorant, the water-soluble organic solvent, the surfactant, the penetrating agent, water, and optionally other components in an aqueous medium, and appropriately stirring and mixing the resulting mixture. The stirring and mixing can be carried out by a sand mill, homogenizer, ball mill, paint shaker, or ultrasonic wave dispersing machine. The stirring and mixing can also be carried out with a stirring device using an ordinary stirring blade, a magnetic stirrer, or a high-speed dispersing device.

—Physical Properties of Ink—

The physical properties of the ink are appropriately adjusted depending on the intended purpose without any restriction. For example, the viscosity and surface tension of the ink are preferably in the following ranges.

The viscosity of the ink is preferably 5 mPa·s to 20 mPa·s ink at 25° C. When the viscosity of the ink is 5 mPa·s or higher, an effect of improving printing density and character quality can be obtained. Moreover, ejection stability of the ink can be ensured by adjusting the viscosity of the ink to be 20 mPa·s or lower. Here, the viscosity can be measured, for example, by a viscometer (RE-550L, manufactured by TOKI SANGYO Co., Ltd.) at a temperature of 25° C.

The static surface tension of the ink is preferably 20 mN/m to 35 mN/m, and more preferably 20 mN/m to 30 mN/m at 25° C. When the static surface tension is in the range of 20 mN/m to 35 mN/m, the permeability of the ink to recording media is increased, which reduces ink bleeding and improves in drying properties of ink printed on plain paper. Since a recording medium coated with the inkjet treatment liquid is easily wetted with the ink, the color developing ability is improved and the occurrence of white spots can be reduced. When the static surface tension is higher than 35 mN/m, leveling of the ink printed on a recording medium coated with the inkjet treatment liquid is difficult to occur, which may take a longer time to dry the ink printed on the recording material.

A color of the ink is appropriately selected depending on the intended purpose without any restriction, and examples thereof include yellow, magenta, cyan, and black. When recording is performed using an ink set composed of at least two of these colors used in combination, a multi-color image can be formed. When recording is performed using an ink set composed of all the colors used in combination, a full-color image can be formed.

The ink of the present invention can be suitably used for printers equipped with any of the following inkjet heads: the piezo type in which ink droplets are ejected by deforming a diaphragm that forms a wall surface of an ink flow path, with the use of a piezoelectric element as a pressure generating unit that pressurizes ink in the ink flow path, and thusly changing the volume of the ink flow path (refer to JP-A No. 02-51734); the thermal type in which bubbles are generated by heating ink in an ink flow path with the use of an exothermic resistive element (refer to JP-A No. 61-59911); and the electrostatic type in which ink droplets are ejected by placing a diaphragm, which form a wall surface of an ink flow path and an electrode, to face each other, then deforming the diaphragm by electrostatic force generated between the diaphragm and the electrode, and thusly changing the volume of the ink flow path (refer to JP-A No. 06-71882).

The ink can be used in a printer having a function of encouraging printing fixation by heating recording media and the ink at a temperature of 50° C. to 200° C., during, before or after printing.

—Image Forming Apparatus—

One example of an apparatus for forming an image with an ink after applying the treatment liquid of the present invention to a recording medium is illustrated in FIG. 1. This apparatus is an apparatus configured to scan the surface of a recording medium using an inkjet recording head.

In the apparatus of FIG. 1, a recording medium 6 is fed by a paper feeding roller 7, and a treatment liquid 1 is uniformly thinly applied to the recording medium 6 by an application roller 4 and a counter roller 5. The treatment liquid 1 is scooped up by a scoop roller 3, and uniformly applied to the surface of the application roller 4 by a film thickness control roller 2. With being applied with the treatment liquid 1, the recording medium 6 is sent to a record scanning section where an inkjet recording head 20 is located. The length of a paper-conveying path from the end point of the inkjet treatment liquid-applying-operation ending section A to the record scanning starting point B is designed to be longer than the length of the recording medium 6 in the paper feeding direction, and thus at the point in time when the recording medium 6 reaches the start point of the record scanning section, application of the inkjet treatment liquid 1 can be completely finished. In this case, since application of the inkjet treatment liquid 1 can be implemented before the inkjet recording head 20 starts scanning for printing and the recording medium 6 is intermittently conveyed, the inkjet treatment liquid 1 can be continuously applied with uniformity onto the recording medium 6 at a constant conveyance speed of the recording medium 6. Note that the exemplary apparatus illustrated in FIG. 1 is designed so that the recording medium 6 requiring treatment is supplied from the lower paper cassette and a recording medium 17 which is unnecessary to be treated or should not be treated is supplied from the upper paper cassette, it is convenient to provide a long paper-conveying path for conveying recording media.

Figure 2:
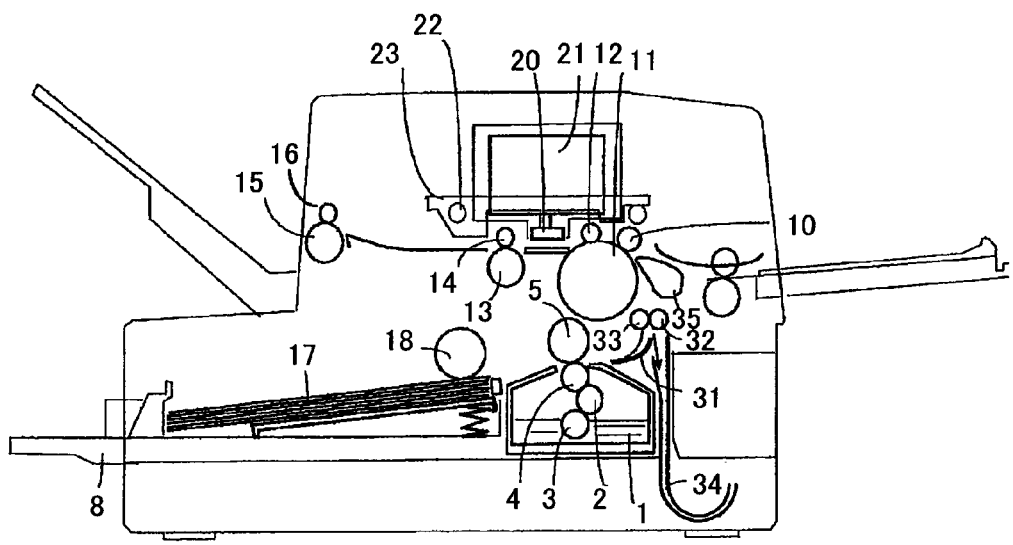
FIG. 2 is a diagram illustrating another example of an image forming apparatus.

Another example of the image forming apparatus, which is different from the example of FIG. 1, is illustrated in FIG. 2. This apparatus is also a type of an apparatus configured to scan a recording medium using an inkjet recording head to thereby form an image. The example depicted in FIG. 2 has the configuration of the apparatus more compact than the apparatus of FIG. 1.

A recording medium 17 is fed by a paper feeding roller 18, and an inkjet treatment liquid 1 is uniformly thinly applied to the recording medium 17 by an application roller 4 and a counter roller 5. The inkjet treatment liquid 1 is scooped up by a scoop roller 3, and uniformly applied to the surface of the application roller 4 by a film thickness control roller 2. With being applied with the inkjet treatment liquid 1, the recording medium 17 passes a record scanning section where an inkjet recording head 20 is located, and is conveyed until application of the inkjet treatment liquid 1 on the recoating medium 17 is completed. At the point in time when application of the inkjet treatment liquid 1 on the recording medium 17 is completed, the recording medium 17 is again returned to the record scanning section until the front end of the recording medium 17 reaches the start point of the record scanning section. Whether or not application of the inkjet treatment liquid is completed can be detected by providing a known recording-medium detection unit (not shown) near the outlet of an inkjet treatment liquid application unit. This detection unit is not necessarily provided, and the apparatus may have a system configuration where information of the length of recording medium 17 is previously input in a controller, and the feed per revolution of the recording medium 17 conveyed on the outer periphery of a recording medium conveying roller corresponds to the length of the recording medium 17 by controlling the number of revolutions of a motor.

The recording medium 17 with the inkjet treatment liquid 1 applied to its surface is conveyed again to the record scanning section before the inkjet treatment liquid 1 is dried and solidified. At this time, the recording medium 17 is intermittently conveyed again to the record scanning section at the right moment of scanning operation of the inkjet recording head 20. If the recording medium 17 is returned to the same path through which it is first conveyed, the rear end of the recording medium 17 is reversely entered into the inkjet treatment liquid application unit, possibly causing defects such as nonuniform coating and jam of the recording medium. When the recording medium 17 is returned backward, the direction thereof is switched by a recording medium guide 31. That is, when the recording medium 17 is conveyed backward after being applied with the inkjet treatment liquid 1, a recording medium guide 31 is moved by a known unit such as a solenoid and a motor.

With this configuration, the recording medium 17 is conveyed to the position where a recording medium return guide 34, and thus it is possible to prevent smear of recording medium 17 and paper jam.

Note that, in FIGS. 1 and 2, 8 is a paper feeding tray, 10 is a paper feeding roller, 11 to 16 are recording medium feeding rollers, 21 is an ink cartridge, 22 is a carriage axis, 23 is carriage, 32 and 33 are recording medium feeding rollers, and 35 is paper feeding guide.

Preferably, the coating step is continuously performed at a constant linear speed of 10 mm/s to 1,000 mm/s. For this reason, in the examples of the image forming apparatus depicted in FIGS. 1 and 2, a recording medium in a sheet form is used, as for a certain sheet of the recording medium, a step of recording an image on the recording medium by an inkjet recording method is started after completion of a step of applying an inkjet treatment liquid onto the certain sheet of a recording medium. In most cases, in such image recording apparatuses, the speed of applying an inkjet treatment liquid does not correspond to the speed of image recording, and thus there is a time difference from a time when an inkjet treatment liquid is applied onto a recording medium to a time when an image is recorded thereon, between the record starting portion of the certain sheet and the record end portion thereof. Even if the time difference is significant, it is possible to substantially prevent evaporation of water from the inkjet treatment liquid having a higher boiling point than that of water, containing a large amount of a hydrophilic solvent with a low evaporation rate and having a water ratio close to an equilibrium water content in the air under an environment where a printer is used. Therefore, the difference in image quality caused between the recording start portion and the recording end portion of the sheet of the recording medium can be lowered to at least the level or lower where such a difference can be visually observed.

As is evident from the conveying process of a recording medium in the apparatuses of FIGS. 1 and 2, in most cases, a recording medium is necessary to be conveyed with members in contact with the recording medium coated with an inkjet treatment liquid, such as rollers, roller bearings, and guides, after application of the inkjet treatment liquid onto the recording medium. In this case, if the inkjet treatment liquid applied to a recording medium is transferred to conveying members of the recording medium, conveying functions may be damaged, and smear may accumulate thereon, causing degradation of image quality. The occurrence of the problem can be prevented by using members, for example, a guide of a waveshaped plate, a spur-shaped roller bearing, and a roller whose surface is made of a water-repellent material.

However, it is desirable that the inkjet treatment liquid applied to a recording medium be quickly absorbed into the recording medium and the surface of recording medium appears dry. To achieve this object, it is effective to adjust the surface tension of the inkjet treatment liquid to 40 mN/m or lower, so that the liquid is quickly absorbed into the recording medium. The "drying and solidifying" of the inkjet treatment liquid that has been applied to a recording medium does not mean that the inkjet treatment liquid is absorbed into the recording medium and the surface of the recording medium appears dry as described above, but means that liquid compounds in the inkjet treatment liquid, such as water, evaporates and cannot maintain a liquid state, followed by solidifying. Even if the inkjet treatment liquid of the present invention is absorbed into a recording medium and the surface thereof appears dry by using the inkjet treatment liquid in a recording apparatus including a combination of an inkjet treatment liquid application unit and an image recording apparatus as described above, inkjet recording can be performed with a state where the inkjet treatment liquid is not actually solidified, and the image quality can be remarkably improved with an extremely small amount of the inkjet treatment liquid to be applied.

In order to control the operation of the inkjet recording apparatuses as shown in FIGS. 1 and 2, when a print order is received by a host machine such as a personal computer, the image forming apparatus (including the inkjet treatment liquid application unit) starts to perform an inkjet treatment liquid application step and a head cleaning step at the same time. After completion of these steps, the image recording apparatus starts to perform an image recording operation. At the data transmitting operation, the image data transmitted per one time may be the data corresponding to one scanning line images, plural scanning line images, or one page images. The head cleaning operation and ink-discharging check operation are not necessarily performed. In addition, it is not necessary to sequentially perform the head cleaning and ink-discharging check operations, and the image data processing and image data transmission operations. Namely, it is possible to start to perform in parallel the inkjet treatment liquid application, head cleaning, ink-discharging check, image data processing and image data transmission operations. By performing these operations in parallel, images can be recorded without substantially deteriorating throughput of the image recording apparatus even when the inkjet treatment liquid application step is performed.

EXAMPLES

The present invention will be more specifically explained through examples and comparative examples, but these examples shall not be construed as limiting the scope of the present invention.

Preparation Example 1

A 500 mL three-necked flask equipped with a stirrer, a thermocouple, and a nitrogen-inlet tube was charged with 2 moles of N,N-dimethylacryl amide and 3 moles of methanol. Subsequently, nitrogen gas was introduced into the flask, and 20 mL of a methanol aqueous solution containing 0.02 moles of sodium methoxide was added at room temperature with stirring. The temperature of the solution gradually increased, and 30 minutes after the start of the reaction, the reaction temperature reached 38° C. The reaction temperature was controlled to the range of 30° C. to 40° C. using a water bath. Five hours later, the reaction solution stopped generating heat, and then the reaction solution was neutralized with acetic acid. After removing non-reacted materials from the reaction solution, the reaction solution was distilled at 133 Pa, and 58° C., to thereby obtain β-methoxy-N,N-dimethylpropione amide as a distillate.

Preparation Example 2

Beta(β)-ethoxy-N,N-dimethylpropione amide was obtained in the same manner as in Preparation Example 1, provided that the methanol solution containing 0.02 moles of sodium methoxide was replaced with 30 mL of an ethanol solution containing 0.02 moles of sodium ethoxide.

Preparation Example 3

Beta(β)-buthoxy-N,N-dimethylpropione amide was obtained in the same manner as in Preparation Example 1, provided that the methanol solution containing 0.02 moles of sodium methoxide was replaced with 50 mL of a n-butanol solution containing 0.02 moles of sodium butoxide.

Examples 1 to 14

Comparative Examples 1 to 14

Preparation of Treatment Liquid

The preparation of a treatment liquid in each Example and Comparative Example was carried out in the following manner.

The materials presented in Tables 1 and 2 were homogeneously mixed for 1 hour. The resulting mixed solution was subjected to pressure filtration using a polyvinylidene fluoride membrane filter having the average pore diameter of 5.0 μm to remove coarse particles or dusts, to thereby produce each of treatment liquids of Examples 1 to 14 and Comparative Examples 1 to 14.

TABLE 1

| Component (% by mass) | | Example | | | | | | |
|---|---|---|---|---|---|---|---|---|
| | | 1 | 2 | 3 | 4 | 5 | 6 | 7 |
| Water-soluble coagulant | Acetic acid | — | — | — | — | 10 | — | — |
| | Lactic acid | 10 | — | 5 | — | — | 10 | 10 |
| | Ammonium lactate | — | 10 | — | — | — | — | — |
| | Calcium lactate | — | — | 1 | — | — | — | — |
| | Calcium nitrate | — | — | — | 10 | — | — | — |
| | SHALLOL DC902P | — | — | — | — | — | — | — |

TABLE 1-continued

|  |  | | | | | | | |
|---|---|---|---|---|---|---|---|---|
|  | (solid content) | | | | | | | |
|  | POLYFIX301 (solid content) | — | — | — | — | — | — | — |
|  | ARAFIX255LOX (solid content) | — | — | — | — | — | — | — |
|  | DK-856 (solid content) | — | — | — | — | — | — | — |
|  | DK-6830 (solid content) | — | — | — | — | — | — | — |
| Amide compound | β-methoxy-N,N-dimethylpropione amide | 10 | 15 | 20 | 10 | 15 | — | — |
|  | β-ethoxy-N,N-dimethylpropione amide | — | — | — | — | — | 20 | — |
|  | β-butoxy-N,N-dimethylpropione amide | — | — | — | — | — | — | 10 |
| Water-soluble organic solvent | 1,3-butanediol | — | 15 | — | — | — | 20 | — |
|  | 3-methyl-1,3-hexanediol | — | — | 20 | — | — | — | 20 |
|  | Glycerin | 20 | — | 10 | 20 | 15 | 10 | 20 |
|  | Propylpropylene diglycol | 20 | — | — | — | — | — | — |
|  | Triethylene glycol dimethyl ether | — | 20 | — | 20 | — | — | — |
|  | 3-methyl-1,3-butanediol | — | — | — | — | 20 | — | — |
| Surfactant | ZONYL FS300 | 0.5 | 0.5 | 0.5 | 0.5 | 0.5 | — | — |
|  | SOFTANOL EP-7025 | — | — | — | — | — | 0.5 | 0.5 |
| Antifungal | Proxel GXL | 0.05 | 0.05 | 0.05 | 0.05 | 0.05 | 0.05 | 0.05 |
|  | Pure water | Bal. | Bal. | Bal. | Bal. | Bal. | Bal. | Bal. |
|  | Total | 100 | 100 | 100 | 100 | 100 | 100 | 100 |

|  |  | Example | | | | | | |
|---|---|---|---|---|---|---|---|---|
| Component (% by mass) | | 8 | 9 | 10 | 11 | 12 | 13 | 14 |
| Water-soluble coagulant | Acetic acid | — | — | 10 | — | — | — | — |
|  | Lactic acid | — | 10 | — | — | — | 10 | — |
|  | Ammonium lactate | 10 | — | — | — | — | — | 10 |
|  | Calcium lactate | — | — | — | — | — | — | — |
|  | Calcium nitrate | — | — | — | — | — | — | — |
|  | SHALLOL DC902P (solid content) | — | 10 | — | — | — | — | — |
|  | POLYFIX301 (solid content) | — | — | 10 | — | — | — | — |
|  | ARAFIX255LOX (solid content) | — | — | — | 10 | — | 10 | — |
|  | DK-856 (solid content) | — | — | — | — | 10 | — | — |
|  | DK-6830 (solid content) | 10 | — | — | — | — | — | 10 |
| Amide compound | β-methoxy-N,N-dimethylpropione amide | 10 | 10 | — | — | 10 | 10 | 10 |
|  | β-ethoxy-N,N-dimethylpropione amide | — | — | 10 | — | — | — | — |
|  | β-butoxy-N,N-dimethylpropione amide | — | — | — | 10 | — | — | — |
| Water-soluble organic solvent | 1,3-butanediol | — | — | — | — | — | — | — |
|  | 3-methyl-1,3-hexanediol | — | — | — | — | — | — | — |
|  | Glycerin | 10 | 15 | 15 | 15 | 15 | 15 | 10 |
|  | Propylpropylene diglycol | — | — | — | — | 15 | — | — |
|  | Triethylene glycol dimethyl ether | — | — | — | 15 | — | — | — |
|  | 3-methyl-1,3-butanediol | 20 | 20 | 20 | — | — | — | — |
| Surfactant | ZONYL FS300 | 0.5 | 0.5 | 0.5 | 0.5 | 0.5 | — | — |
|  | SOFTANOL EP-7025 | — | — | — | — | — | 0.5 | 0.5 |
| Antifungal | Proxel GXL | 0.05 | 0.05 | 0.05 | 0.05 | 0.05 | 0.05 | 0.05 |
|  | Pure water | Bal. | Bal. | Bal. | Bal. | Bal. | Bal. | Bal. |
|  | Total | 100 | 100 | 100 | 100 | 100 | 100 | 100 |

TABLE 2

|  |  | Comparative Example | | | | | | |
|---|---|---|---|---|---|---|---|---|
| Component (% by mass) | | 1 | 2 | 3 | 4 | 5 | 6 | 7 |
| Water-soluble coagulant | Acetic acid | — | — | — | — | 10 | — | — |
|  | Lactic acid | 10 | — | 5 | — | — | 10 | 10 |
|  | Ammonium lactate | — | 10 | — | — | — | — | — |
|  | Calcium lactate | — | — | 1 | — | — | — | — |
|  | Calcium nitrate | — | — | — | 10 | — | — | — |
|  | SHALLOL DC902P (solid content) | — | — | — | — | — | — | — |

TABLE 2-continued

|  | Component (% by mass) |  |  |  |  |  |  |
|---|---|---|---|---|---|---|---|
|  | POLYFIX301 (solid content) | — | — | — | — | — | — |
|  | ARAFIX255LOX (solid content) | — | — | — | — | — | — |
|  | DK-856 (solid content) | — | — | — | — | — | — |
|  | DK-6830 (solid content) | — | — | — | — | — | — |
| Water-soluble organic solvent | 1,3-butanediol | 10 | 25 | 10 | 10 | 10 | 30 | — |
|  | 3-methyl-1,3-hexanediol | — | — | 20 | — | — | — | 20 |
|  | Glycerin | 20 | — | 10 | 20 | 15 | 10 | 20 |
|  | Propylpropylene diglycol | 20 | — | — | — | — | — | — |
|  | Triethylene glycol dimethyl ether | — | 20 | — | 20 | — | — | — |
|  | 3-methyl-1,3-butanediol | — | — | — | — | 20 | — | — |
| Surfactant | ZONYL FS300 | 0.5 | 0.5 | 0.5 | 0.5 | 0.5 | 0.5 | — |
|  | SOFTANOL EP-7025 | — | — | — | — | — | — | 0.5 |
| Antifungal | Proxel GXL | 0.05 | 0.05 | 0.05 | 0.05 | 0.05 | 0.05 | 0.05 |
|  | Pure water | Bal. | Bal. | Bal. | Bal. | Bal. | Bal. | Bal. |
|  | Total | 100 | 100 | 100 | 100 | 100 | 100 | 100 |

|  |  | Comparative Example |  |  |  |  |  |  |
|---|---|---|---|---|---|---|---|---|
|  | Component (% by mass) | 8 | 9 | 10 | 11 | 12 | 13 | 14 |
| Water-soluble coagulant | Acetic acid | — | — | 10 | — | — | — | — |
|  | Lactic acid | — | 10 | — | — | — | 10 | — |
|  | Ammonium lactate | 10 | — | — | — | — | — | 10 |
|  | Calcium lactate | — | — | — | — | — | — | — |
|  | Calcium nitrate | — | — | — | — | — | — | — |
|  | SHALLOL DC902P (solid content) | — | 10 | — | — | — | — | — |
|  | POLYFIX301 (solid content) | — | — | 10 | — | — | — | — |
|  | ARAFIX255LOX (solid content) | — | — | — | 10 | — | 10 | — |
|  | DK-856 (solid content) | — | — | — | — | 10 | — | — |
|  | DK-6830 (solid content) | 10 | — | — | — | — | — | 10 |
| Water-soluble organic solvent | 1,3-butanediol | — | — | — | — | — | — | — |
|  | 3-methyl-1,3-hexanediol | — | — | — | — | — | — | — |
|  | Glycerin | 10 | 15 | 15 | 15 | 15 | 15 | 10 |
|  | Propylpropylene diglycol | — | — | — | — | 15 | — | — |
|  | Triethylene glycol dimethyl ether | — | — | — | 15 | — | — | — |
|  | 3-methyl-1,3-butanediol | 20 | 20 | 20 | — | — | — | — |
| Surfactant | ZONYL FS300 | 0.5 | 0.5 | 0.5 | 0.5 | — | — | — |
|  | SOFTANOL EP-7025 | — | — | — | — | — | — | — |
| Antifungal | Proxel GXL | 0.05 | 0.05 | 0.05 | 0.05 | 0.05 | 0.05 | 0.05 |
|  | Pure water | Bal. | Bal. | Bal. | Bal. | Bal. | Bal. | Bal. |
|  | Total | 100 | 100 | 100 | 100 | 100 | 100 | 100 |

In Tables 1 and 2, "Bal." denotes "balance."

The abbreviations presented in Tables 1 and 2 are as follows:

*acetic acid: acetic anhydride, manufactured by Wako Pure Chemical Industries, purity: 97% by mass or higher

*lactic acid: manufactured by Tokyo Chemical Industry Co., Ltd., purity: 85% by mass or higher

*ammonium lactate: Musashino Chemical Laboratory, Ltd.; purity: 66% by mass

*calcium lactate: calcium DL-lactate pentahydrate, manufactured by Wako Pure Chemical Industries, purity: 95% by mass

*calcium nitrate: calcium nitrate tetrahydrate, manufactured by Wako Pure Chemical Industries, purity: 98.5% by mass

*SHALLOL DC902C: water-soluble cationic polymer (dimethyl diallyl ammonium chloride homopolymer), manufactured by Dai-ichi Kogyo Seiyaku Co., Ltd.; molecular weight: 9,000; active ingredient: 51.5% by mass

*POLYFIX 301: water-soluble cationic polymer (polyamide, epichlorohydrin polymer), manufactured by Showa Highpolymer Co., Ltd., molecular weight: 3,000; active ingredient: 30% by mass

*ARAFIX 255LOX: cation polymer (epichlorohydrin polymer), manufactured by Arakawa Chemical Industries, Ltd., active ingredient: 25% by mass

*DK-856: water-soluble cationic polymer (polyamine resin), manufactured by SEIKO PMC CORPORATION, active ingredient: 50% by mass

*DK-6830: water-soluble cationic polymer (polyamide, epichlorohydrin polymer), manufactured by SEIKO PMC CORPORATION, active ingredient: 55% by mass

*ZONYL FS-300: polyoxyethylene perfluoroalkyl ether, manufactured by E.I. du Pont de Nemours & Company, active ingredient: 40% by mass

*SOFTANOL EP-7025: polyoxyalkylene alkylene ether (manufactured by Nippon Shokubai Co., Ltd.; active ingredient: 100% by mass)

*Proxel GXL: antifungal agent containing 1,2-benzisothiazolin-3-one as a main component (manufactured by Avecia Inc.; component: 20% by mass; dipropylene glycol is contained.)

Preparation Example 4

Preparation of Pigment-Containing Polymer Particle Dispersion Liquid (1) Preparation of Polymer Solution A A 1L-flask equipped with a mechanical stirrer, a thermometer, a nitrogen-inlet tube, a reflux tube and a dropping funnel, which had been sufficiently purged with nitrogen gas, styrene (11.2 g), acrylic acid (2.8 g), lauryl methacrylate (12.0 g), polyethylene glycol methacrylate (4.0 g), styrene macromer (4.0 g), and mercaptoethanol (0.4 g) were mixed together, and the mixture was heated to 65° C.

Next, a mixed solution of styrene (100.8 g), acrylic acid (25.2 g), lauryl methacrylate (108.0 g), polyethylene glycol methacrylate (36.0 g), hydroxyethyl methacrylate (60.0 g), styrene macromer (36.0 g), mercaptoethanol (3.6 g), azobis methylvaleronitrile (2.4 g), and methyl ethyl ketone (18 g) was added dropwise into the flask over 2.5 hours Thereafter, a mixed solution of azobis methylvaleronitrile (0.8 g) and methyl ethyl ketone (18 g) was added dropwise into the flask for 0.5 hours. The resulting mixture was matured at 65° C. for 1 hour, followed by adding azobis methylvaleronitrile (0.8 g) to the mixture. The resulting mixture was further matured for 1 hour. Upon completion of the reaction, methyl ethyl ketone (364 g) was added to the flask, to thereby obtain 800 g of a polymer solution A having a concentration of 50% by mass.

(2) Preparation of Pigment-Containing Polymer Particle Dispersion Liquid

The polymer solution A (28 g), and the respective colorant presented in Table 3 (42 g), a 1 mol/L aqueous potassium hydroxide solution (13.6 g), methyl ethyl ketone (20 g), and ion exchanged water (13.6 g) were sufficiently stirred and then kneaded using a roll mill. After the resulting paste was put into pure water (200 g) and sufficiently stirred, the methyl ethyl ketone and water were distilled away using an evaporator, and the dispersion liquid was subjected to pressure filtration using a polyvinylidene fluoride membrane filter having the average pore diameter of 5.0 μm so as to remove coarse particles, to thereby obtain a pigment-containing polymer particle dispersion liquid having the pigment content of 15% by mass and a solid content of 20% by mass. The average particle diameter ($D_{50}$) of the polymer particles in the obtained dispersion liquid was measured. The result is presented in Table 3. Note that, a particle size distribution measuring device (NANOTRACK UPA-EX150, manufactured by Nikkiso Co., Ltd.) was used for the measurement of the average particle diameter ($D_{50}$).

TABLE 3

| Pigment-containing polymer particle dispersion liquid | Colorant | Average particle diameter ($D_{50}$) |
|---|---|---|
| Magenta pigment-containing polymer particle dispersion liquid | C.I. Pigment Red 122 | 82.7 nm |
| Cyan pigment-containing polymer particle dispersion liquid | C.I. Pigment Blue 15:3 | 110.6 nm |
| Yellow pigment-containing polymer particle dispersion liquid | C.I. Pigment Yellow 74 | 105.4 nm |
| Black pigment-containing polymer particle dispersion liquid | Carbon black (FW100, Degussa HÜLS AG) | 75.2 nm |

Preparation Example 5

Preparation of Ink

Inks 1 to 8 were prepared in the following manners.

A water-soluble organic solvent (wetting agent), penetrant, surfactant, antifungal agent and water were mixed each in an amount presented in a respective column of the inks 1 to 8 of Table 4, and stirred for 1 hour to thereby uniformly mix the materials. Subsequently, to the resulting mixture, a water-dispersible resin was added, and the mixture was stirred for 1 hour. Then, a pigment dispersion liquid, a defoaming agent, and a pH regulator were added, and the resulting mixture was stirred for 1 hour. The obtained dispersion liquid was then subjected to pressure filtration using a polyvinylidene fluoride membrane filter having the average pore diameter of 5.0 μm to remove coarse particles or dusts, to thereby obtain each of inks 1 to 8.

TABLE 4

| | | Ink | | | | | | | |
|---|---|---|---|---|---|---|---|---|---|
| | | 1 | 2 | 3 | 4 | 5 | 6 | 7 | 8 |
| Pigment | Magenta pigment-containing polymer dispersion | 33.3 | — | — | — | — | — | — | — |
| | Cyan pigment-containing polymer dispersion | — | 33.3 | — | — | — | — | — | — |
| | Yellow pigment-containing polymer dispersion | — | — | 33.3 | — | — | — | — | — |
| | Black pigment-containing polymer dispersion | — | — | — | 50.0 | — | — | — | — |
| | Magenta pigment self dispersion liquid (CAB-O-JET260) | — | — | — | — | 49.0 | — | — | — |
| | Cyan pigment self dispersion liquid (CAB-O-JET250) | — | — | — | — | — | 45.0 | — | — |
| | Yellow pigment self dispersion liquid (CAB-O-JET270) | — | — | — | — | — | — | 45.0 | — |
| | Black pigment self dispersion liquid (CAB-O-JET300) | — | — | — | — | — | — | — | 50.0 |
| Water-dispersible resin | Fluororesin emulsion | — | — | — | — | 6.0 | 8.0 | 8.0 | 6.0 |
| | Acryl-silicone resin emulsion | 2.0 | 3.0 | 2.0 | 5.0 | — | — | — | — |

TABLE 4-continued

|  |  | Ink | | | | | | | |
|---|---|---|---|---|---|---|---|---|---|
|  |  | 1 | 2 | 3 | 4 | 5 | 6 | 7 | 8 |
| Water-soluble organic solvent | 1,3-butanediol | 21.8 | 26.0 | 26.0 | — | 30.0 | 17.0 | 27.0 | — |
|  | 3-methyl-1,3-butanediol | — | — | — | 16.0 | — | — | — | 16.0 |
|  | 2-pyrrolidone | — | — | — | — | — | — | — | 2.0 |
|  | glycerin | 14.5 | 13.0 | 13.0 | 16.0 | 10.0 | 17.0 | 9.0 | 16.0 |
| Penetrating agent | 2-ethyl-1,3-hexanediol | 1.0 | 1.0 | 1.0 | 1.0 | 2.0 | 2.0 | 2.0 | 2.0 |
|  | 2,2,4-trimethyl-1,3-pentanediol | 1.0 | 1.0 | 1.0 | 1.0 | — | — | — | — |
| Surfactant | KF-640 | — | — | — | — | 1.0 | 1.0 | 1.0 | 1.0 |
|  | SOFTANOL EP-7025 | 1.0 | 1.0 | 1.0 | 1.0 |  |  |  |  |
| Antifungal | Proxel GXL | 0.1 | 0.1 | 0.1 | 0.1 | 0.1 | 0.1 | 0.1 | 0.1 |
| Defoaming agent | Silicone defoaming agent KM-72F | 0.1 | 0.1 | 0.1 | 0.1 | 0.1 | 0.1 | 0.1 | 0.1 |
| pH adjustor | 2-amino-2-ethyl-1,3-propanediol | 0.3 | 0.3 | 0.3 | 0.3 | 0.3 | 0.3 | 0.3 | 0.3 |
|  | Pure water | 25.0 | 21.3 | 22.3 | 9.6 | 1.6 | 9.6 | 7.6 | 6.6 |
|  | Total (% by mass) | 100 | 100 | 100 | 100 | 100 | 100 | 100 | 100 |

The abbreviations presented in Table 4 are specifically as follows:

*magenta pigment-containing polymer particle dispersion liquid (as presented in Table 3)
*cyan pigment-containing polymer particle dispersion liquid (as presented in Table 3)
*yellow pigment-containing polymer particle dispersion liquid (as presented in Table 3)
*black pigment-containing polymer particle dispersion liquid (as presented in Table 3)
*CAB-O-JET 260: manufactured by Cabot Corporation, pigment solid content of 11% by mass
*CAB-O-JET 250: manufactured by Cabot Corporation, pigment solid content of 11% by mass
*CAB-O-JET 270: manufactured by Cabot Corporation, pigment solid content of 11% by mass
*CAB-O-JET 300: manufactured by Cabot Corporation, pigment solid content of 15% by mass
*fluororesin emulsion: LUMIFLON FE4500 manufactured by Asahi Glass Co., Ltd., having a solid content of 52% by mass, the average particle diameter of 136 nm, and the minimum film forming temperature (MFT) of 28° C.
*acryl-silicone resin emulsion: POLYZOL ROY6312 manufactured by Showa Highpolymer Co., Ltd., having a solid content of 40% by mass, the average particle diameter of 171 nm, and the minimum film forming temperature (MFT) of 20° C.
*KF-640: polyether-modified silicone surfactant (manufactured by Shin-Etsu Chemical Co., Ltd., component: 100% by mass)
*SOFTANOL EP-7025: polyoxyalkylene alkylene ether (manufactured by Nippon Shokubai Co., Ltd.; component: 100% by mass)
*Proxel GXL: antifungal agent containing 1,2-benzisothiazolin-3-one as a main component (manufactured by Avecia Inc.; component: 20% by mass, dipropylene glycol is contained.)
*KM-72F: self-emulsified silicone defoaming agent (manufactured by Shin-Etsu Chemical Co., Ltd., component: 100% by mass)

Examples 15 to 28

Comparative Examples 15 to 28

Image formation according to each of Examples and Comparative Examples was performed using high quality paper of Ricoh Company Limited (My_paper, basis weight: 69.6 g/m$^2$, size: 23.2 seconds, air permeability: 21 seconds) as a recording medium under the conditions presented in Table 5. The ink was used as a ink set containing four colors, a set of the inks 1 to 4 or a set of the inks 5 to 8, prepared in the Preparation Example 5.

<Coating (Application) of Treatment Liquid>

A coating treatment containing, after drying a recording medium in the environment controlled to have the temperature of 23° C.±0.5° C., and the humidity of 50% RH±5% RH, applying a treatment liquid immediately on a surface of a recording medium on which printing would be performed was performed by preparing a device, as in the coating section illustrated with the dashed line C of FIG. 1.

As the application roller 4, a roller in which a plated iron having a diameter of 22 mm was coated with polychloroprene having a rubber hardness of 50 degrees in a thickness of 3 mm was used, and as the counter roller 5, a roller formed of SUS304 having a diameter of 12 mm was used. The lengths of the rollers in the lengthening direction were all 300 mm. The treatment liquid storage tank was located so that a distance between the bottom end of the application roller and the bottom of the storage casing became 2 mm. The application roller 4 was connected to a driving motor via a gear. The application roller 4 was configured so that the roller can be driven with appropriately varying the rotational speed thereof, and that the treatment liquid is applied at the bottom face side of the sheet as the sheet was inserted between the application roller 4 and the counter roller 5.

The conveying speed was appropriately changed so that a coating amount of the treatment liquid became constant.

<Image Formation>

After applying the treatment liquid in the manner described above, printing was immediately performed by means of an inkjet printer (IPSiO GX5000, manufactured by Ricoh Company Limited). The drive voltage of the piezo element in the printer was varied so as to uniformly discharge an ink and to make the ink adhere in the same amount to each of the recording media.

TABLE 5

| | Coating step | | | Image forming step | |
|---|---|---|---|---|---|
| | Treatment liquid | Deposition amount (g/m$^2$) | Coating method | Ink set | GX5000 Printing mode |
| Ex. 15 | Ex. 1 | 0.1 | Roller coating | Ink 1-4 | Plain paper/ standard high speed |

TABLE 5-continued

| | Treatment liquid | Coating step Deposition amount (g/m²) | Coating method | Image forming step Ink set | GX5000 Printing mode |
|---|---|---|---|---|---|
| Ex. 16 | Ex. 2 | 0.1 | Roller coating | Ink 5-8 | Plain paper/standard high speed |
| Ex. 17 | Ex. 3 | 0.1 | Roller coating | Ink 1-4 | Plain paper/standard high speed |
| Ex. 18 | Ex. 4 | 0.1 | Roller coating | Ink 5-8 | Plain paper/standard high speed |
| Ex. 19 | Ex. 5 | 0.1 | Roller coating | Ink 1-4 | Plain paper/standard high speed |
| Ex. 20 | Ex. 6 | 0.1 | Roller coating | Ink 5-8 | Plain paper/standard high speed |
| Ex. 21 | Ex. 7 | 0.1 | Roller coating | Ink 1-4 | Plain paper/standard high speed |
| Ex. 22 | Ex. 8 | 0.1 | Roller coating | Ink 5-8 | Plain paper/standard high speed |
| Ex. 23 | Ex. 9 | 0.1 | Roller coating | Ink 1-4 | Plain paper/standard high speed |
| Ex. 24 | Ex. 10 | 0.1 | Roller coating | Ink 5-8 | Plain paper/standard high speed |
| Ex. 25 | Ex. 11 | 0.1 | Roller coating | Ink 1-4 | Plain paper/standard high speed |
| Ex. 26 | Ex. 12 | 0.1 | Roller coating | Ink 5-8 | Plain paper/standard high speed |
| Ex. 27 | Ex. 13 | 0.1 | Roller coating | Ink 1-4 | Plain paper/standard high speed |
| Ex. 28 | Ex. 14 | 0.1 | Roller coating | Ink 5-8 | Plain paper/standard high speed |
| Comp. Ex. 15 | Comp. Ex. 1 | 0.1 | Roller coating | Ink 1-4 | Plain paper/standard high speed |
| Comp. Ex. 16 | Comp. Ex. 2 | 0.1 | Roller coating | Ink 5-8 | Plain paper/standard high speed |
| Comp. Ex. 17 | Comp. Ex. 3 | 0.1 | Roller coating | Ink 1-4 | Plain paper/standard high speed |
| Comp. Ex. 18 | Comp. Ex. 4 | 0.1 | Roller coating | Ink 5-8 | Plain paper/standard high speed |
| Comp. Ex. 19 | Comp. Ex. 5 | 0.1 | Roller coating | Ink 1-4 | Plain paper/standard high speed |
| Comp. Ex. 20 | Comp. Ex. 6 | 0.1 | Roller coating | Ink 5-8 | Plain paper/standard high speed |
| Comp. Ex. 21 | Comp. Ex. 7 | 0.1 | Roller coating | Ink 1-4 | Plain paper/standard high speed |
| Comp. Ex. 22 | Comp. Ex. 8 | 0.1 | Roller coating | Ink 5-8 | Plain paper/standard high speed |
| Comp. Ex. 23 | Comp. Ex. 9 | 0.1 | Roller coating | Ink 1-4 | Plain paper/standard high speed |
| Comp. Ex. 24 | Comp. Ex. 10 | 0.1 | Roller coating | Ink 5-8 | Plain paper/standard high speed |
| Comp. Ex. 25 | Comp. Ex. 11 | 0.1 | Roller coating | Ink 1-4 | Plain paper/standard high speed |
| Comp. Ex. 26 | Comp. Ex. 12 | 0.1 | Roller coating | Ink 5-8 | Plain paper/standard high speed |
| Comp. Ex. 27 | Comp. Ex. 13 | 0.1 | Roller coating | Ink 1-4 | Plain paper/standard high speed |
| Comp. Ex. 28 | Comp. Ex. 14 | 0.1 | Roller coating | Ink 5-8 | Plain paper/standard high speed |

<<Evaluation of Treatment Liquid>>

The viscosity change after the moisture evaporation and storage stability of each of the treatment liquids of Examples 1 to 14 and Comparative Examples 1 to 14 was measured and evaluated in the following manners. The results are presented in Table 6.

<Viscosity Change after Evaporation>

The moisture contained in each of the treatment liquids was evaporated, and the viscosity of the treatment liquid before and after the moisture evaporation was measured. Specifically, the treatment liquid was weighed in a dish by 1 g, and the dish was stood still in a thermostatic chamber of 50° C., and 20% RH. One day later, the viscosity of the treatment liquid was measured.

The viscosity was measured at 25° C. by means of a viscometer (RE-5504 manufactured by TOKI SANGYO Co., Ltd.).

[Evaluation Criteria]

I: the viscosity change before and after drying was less than 100 mPas

II: the viscosity change before and after drying was 100 mPas or more but less than 200 mPas III: the viscosity change before and after drying was 200 mPas or more <Storage Stability>

Each treatment liquid was left to stand in a thermostatic chamber of 70° C. for 2 weeks, and the change rate between the viscosity of the treatment liquid before and after the standing in the thermostatic chamber was measured, and evaluated based on the following criteria.

[Evaluation Criteria]

A: the viscosity change of less than 5%

B: the viscosity change of 5% or more but less than 10%

C: the viscosity change of 10% or more but less than 20%

D: the viscosity change of 20% or more

<Image Evaluation>

The image density and image saturation of the image were evaluated in the following manners.

<Image Density>

A chart including a 64-point solid square symbol "■" produced using MICROSOFT WORD 2000 was printed on each of recording media, and the image density of the "■" portion on a print surface was measured with a densitometer X-Rite 938 and the measured values were evaluated according to the following evaluation criteria. The print mode was set to "Plain Paper—Standard High Speed" mode and color matching-off-mode by using a driver attached to a printer.

The color specification of the solid square symbol was designated by setting the values of red (R), green (G), and blue (B) of the RGB color model as below.

Black: (R)0, (G)0, (B)0
Yellow: (R)255, (G)255, (B)0
Magenta: (R)255, (G)0, (B)255
Cyan: (R)0, (G)0, (B)255

[Evaluation Criteria]

A Black: 1.3 or higher
  Yellow: 0.85 or higher,
  Magenta: 1.05 or higher
  Cyan: 1.1 or higher
B Black: 1.2 or higher but lower than 1.3
  Yellow: 0.8 or higher but lower than 0.85
  Magenta: 1.0 or higher but lower than 1.05
  Cyan: 1.0 or higher but lower than 1.1
C Black: 1.15 or higher but lower than 1.2
  Yellow: 0.75 or higher but lower than 0.8
  Magenta: 0.95 or higher but lower than 1.0
  Cyan: 0.95 or higher but lower than 1.0
D Black: lower than 1.15
  Yellow: lower than 0.75
  Magenta: lower than 0.95
  Cyan: lower than 0.95

<Image Saturation>

A chart was printed on recording media in the same manner as in the evaluation of the image density. The image saturation of the symbol "■" portion on a print surface was measured with the X-RITE 938, a ratio of the measured saturation value to the saturation value of the standard color (Japan color ver. 2) (Yellow: 91.34, Magenta: 74. 55, Cyan: 62.82) was calculated. The results were judged based on the following evaluation criteria. The print mode was set to "Plain Paper—Standard High Speed" mode and color matching-off-mode by using a driver attached to a printer.

[Evaluation Criteria]
A: 0.85 or higher
B: 0.8 or higher but lower than 0.85
C: 0.75 or higher but lower than 0.8
D: lower than 0.75

The evaluation was performed on each color ink. Consequently, as for the result of each image quality, the majority of the evaluation judgment result was presented in Table 6 out of the obtained judgement results. In the case where there are two groups including the identical numbers of the judgement results, the better result was presented in Table 6.

TABLE 6

| | Evaluation of treatment liquid | | Image evaluation | |
|---|---|---|---|---|
| | Viscosity after evaporation | Storage stability | Image density | Image saturation |
| Ex. 15 | I | A | A | A |
| Ex. 16 | I | A | A | A |
| Ex. 17 | I | A | A | A |
| Ex. 18 | I (*1) | A | A | A |
| Ex. 19 | I | A | B | B |
| Ex. 20 | I | A | A | A |
| Ex. 21 | II | A | A | A |
| Ex. 22 | I | A | A | A |
| Ex. 23 | I | A | A | A |
| Ex. 24 | I | A | A | A |
| Ex. 25 | II | A | B | B |
| Ex. 26 | I | A | B | B |
| Ex. 27 | II | A | A | A |
| Ex. 28 | II | A | A | A |
| Comp. Ex. 15 | III | A | A | A |
| Comp. Ex. 16 | III | A | A | A |
| Comp. Ex. 17 | III | A | A | A |
| Comp. Ex. 18 | III (*1) | A | A | A |
| Comp. Ex. 19 | III | A | B | B |
| Comp. Ex. 20 | III | A | A | A |
| Comp. Ex. 21 | III | A | A | A |
| Comp. Ex. 22 | III | A | A | A |
| Comp. Ex. 23 | III | A | B | B |
| Comp. Ex. 24 | III | A | B | B |
| Comp. Ex. 25 | III | A | A | A |
| Comp. Ex. 26 | III | A | A | A |
| Comp. Ex. 27 | III | A | A | A |
| Comp. Ex. 28 | III | A | A | A |

In Table 6, (*1) denotes that precipitates were generated by the evaporation.

The treatment liquid of the present invention can be applied for various recording by inkjet recording, and for example, is particularly suitably applied in an inkjet recording printer, a facsimile, a copying device, and a printer-facsimile-copier complex device.

The embodiments of the present invention are as follows:
<1> An inkjet treatment liquid, containing:
a water-soluble coagulant;
a water-soluble organic solvent;
water; and
an amide compound represented by the following general formula:

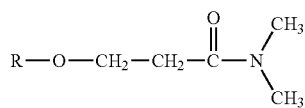

where R is a C1-C6 alkyl group.

<2> The inkjet treatment liquid according to <1>, wherein R of the amide compound is a methyl group.
<3> The inkjet treatment liquid according to any of <1> or <2>, wherein the water-soluble coagulant is at least one selected from the group consisting of a water-soluble aliphatic organic acid, an ammonium salt thereof, and a cationic polymer.
<4> An image forming method, containing:
applying the inkjet treatment liquid as defined in any one of <1> to <3> onto a surface of a recording medium; and
ejecting an inkjet recording ink corresponding to an imaging signal to form an image on the surface of the recording medium to which the inkjet treatment liquid has been applied,
wherein the inkjet recording ink contains a colorant, a water-soluble organic solvent, and water.

REFERENCE SIGNS LIST

A: treatment liquid-applying-operation ending section
B: start point of the record scanning
1: treatment liquid
2: film thickness control roller
3: scoop roller
4: application roller
5: counter roller
6: recording medium
7: paper feeding roller
8: paper feeding tray
10: paper feeding roller
11: recording medium feeding roller
12: recording medium feeding roller
13: recording medium feeding roller
14: recording medium feeding roller
15: recording medium feeding roller
16: recording medium feeding roller
17: recording medium
18: paper feeding roller
20: inkjet recording head
21: ink cartridge
22: carriage axis
23: carriage
31: recording medium guide
32: recording medium feeding roller
33: recording medium feeding roller
34: recording medium return guide
35: paper feeding guide

The invention claimed is:
1. An inkjet treatment liquid, comprising:
a water-soluble coagulant;
a water-soluble organic solvent;
water; and
an amide compound represented by:

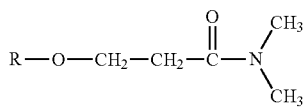

where R is a C1-C6 alkyl group.
2. The inkjet treatment liquid according to claim 1, wherein R of the amide compound is a methyl group.
3. The inkjet treatment liquid according to claim 1, wherein the water-soluble coagulant is at least one compound selected from the group consisting of a water-soluble aliphatic organic acid, an ammonium salt of a water-soluble aliphatic organic acid, and a cationic polymer.

4. An image forming method, comprising:
applying an inkjet treatment liquid onto a surface of a recording medium; and
ejecting an inkjet recording ink corresponding to an imaging signal to form an image on the surface of the recording medium to which the inkjet treatment liquid has been applied,
wherein the inkjet recording ink comprises a colorant, a water-soluble organic solvent, and water, and
wherein the inkjet treatment liquid comprises:
a water-soluble coagulant;
a water-soluble organic solvent;
water; and
an amide compound represented by:

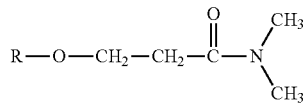

where R is a C1-C6 alkyl group.

5. The inkjet treatment liquid according to claim 2, wherein the water-soluble coagulant is at least one compound selected from the group consisting of a water-soluble aliphatic organic acid, an ammonium salt of a water-soluble aliphatic organic acid, and a cationic polymer.

6. The image forming method according to claim 4, wherein R of the amide compound is a methyl group.

7. The image forming method according to claim 4, wherein the water-soluble coagulant is at least one compound selected from the group consisting of a water-soluble aliphatic organic acid, an ammonium salt of a water-soluble aliphatic organic acid, and a cationic polymer.

8. The image forming method according to claim 4, wherein the water-soluble coagulant is at least one compound selected from the group consisting of a water-soluble aliphatic organic acid, an ammonium salt of a water-soluble aliphatic organic acid, and a cationic polymer.

* * * * *